United States Patent
Hanseler et al.

(10) Patent No.: US 10,454,398 B2
(45) Date of Patent: Oct. 22, 2019

(54) SYSTEMS AND METHODS FOR CONTROL OF ELECTRIC MOTORS

(71) Applicant: FLIR Surveillance, Inc., Wilsonville, OR (US)

(72) Inventors: Ralph Hanseler, Methuen, MA (US); Mitchell Kary, Haverhill, MA (US)

(73) Assignee: FLIR SURVEILLANCE, INC., Wilsonville, OR (US)

( * ) Notice: Subject to any disclaimer, the term of this patent is extended or adjusted under 35 U.S.C. 154(b) by 0 days.

(21) Appl. No.: 15/963,995

(22) Filed: Apr. 26, 2018

(65) Prior Publication Data

US 2018/0316290 A1    Nov. 1, 2018

Related U.S. Application Data

(60) Provisional application No. 62/491,962, filed on Apr. 28, 2017.

(51) Int. Cl.
| | |
|---|---|
| *H02P 6/16* | (2016.01) |
| *H02P 23/14* | (2006.01) |
| *H02P 6/08* | (2016.01) |
| *H02P 23/16* | (2016.01) |
| *H02P 23/00* | (2016.01) |

(52) U.S. Cl.
CPC .......... *H02P 6/16* (2013.01); *H02P 6/08* (2013.01); *H02P 23/0004* (2013.01); *H02P 23/14* (2013.01); *H02P 23/16* (2016.02)

(58) Field of Classification Search
CPC ................................................ H02P 6/16
USPC ............ 318/400.38, 400.37, 400.01, 700
See application file for complete search history.

(56) References Cited

U.S. PATENT DOCUMENTS

| | | | |
|---|---|---|---|
| 6,885,163 B2 * | 4/2005 | Heidrich | H02P 6/185 318/400.11 |
| 7,045,986 B2 * | 5/2006 | Anghel | H02P 6/185 318/712 |
| 8,970,158 B1 | 3/2015 | Chowning | |

(Continued)

OTHER PUBLICATIONS

"thingap Product Data Sheet TG7140 DC Brushless Motor", 2013, 4 pages, ThinGap, LLC, Ventura, US.

(Continued)

*Primary Examiner* — David Luo
(74) *Attorney, Agent, or Firm* — Haynes and Boone, LLP

(57) ABSTRACT

Techniques are disclosed for facilitating control of electric motors. A system includes a brushless direct current (BLDC) electric motor that includes a rotor and windings, where the rotor is configured to rotate with an adjustable angular speed. The system further includes a plurality of switching regulators. Each switching regulator is configured to generate an electrical drive signal based on to a torque control signal, where the angular speed of the rotor is based on the electrical drive signals. The system further includes a commutation logic circuit configured to selectively provide the electrical drive signals of the switching regulators to the windings based on a position of the rotor. To selectively provide the electrical drive signals, the commutation logic circuit may be configured to provide routing control signals provided as six-step commutation signals or motor phase control signals provided as sinusoidal commutation signals. Related systems, devices, and methods are also disclosed.

20 Claims, 9 Drawing Sheets

(56) References Cited

U.S. PATENT DOCUMENTS 9,525,372 B2 * 12/2016 Hill .................... H02P 6/186
2014/0232310 A1    8/2014 Bartalucci et al.

OTHER PUBLICATIONS

"BLDC Motor Control Algorithms", Jul. 1, 2002, 4 pages [online], [retrieved on Apr. 26, 2018]. Retrieved from the Internet: <URL: https://www.renesas.com/en-us/solutions/key-technology/motor-control/motor-algorithms/bldc.html>.

* cited by examiner

SYSTEMS AND METHODS FOR CONTROL OF ELECTRIC MOTORS

CROSS-REFERENCE TO RELATED APPLICATIONS

This application claims the benefit of U.S. Provisional Patent Application No. 62/491,962 filed Apr. 28, 2017 and entitled "SYSTEMS AND METHODS FOR CONTROL OF ELECTRIC MOTORS" which is hereby incorporated by reference in its entirety.

TECHNICAL FIELD

One or more embodiments relate generally to electric motors and more particularly, for example, to control systems for direct current (DC) electric motors.

BACKGROUND

DC electric motors are used in a variety of different applications and environments. In many cases, precise control of an electric motor's operational characteristics is desirable, particularly when used for bidirectional control, such as gimbal platforms.

In some applications, brushless direct current (BLDC) motors are used. Conventional commutation logic provides sequential signaling to excite the motor's windings in a manner that results in the motor's motion. In some conventional approaches, to regulate the motor's torque, pulse width modulation (PWM) control signals that occur simultaneously with the commutation logic vary the duty cycle of a high frequency waveform that is applied to cause high frequency switching (e.g., turning on or off) of switches and/or to alternately connect and disconnect a power source to/from the motor's windings. In some cases, the high frequency nature of the switching and/or connection/disconnection is effectively converted to a DC current by the smoothing provided via the motor's inductance. To adjust the current passing through the windings (e.g., and thus adjust the speed of the electric motor), duty cycles of the PWM control signals may be adjusted.

Although BLDC motors may advantageously provide high performance and reduced wear (e.g., due to the use of PWM control signals for commutation rather than brushes), the switching noise associated with the PWM control signals can interfere with sensitive electronics. For example, in servo motor applications (e.g., gyro-stabilized gimbals) and/or other applications, electric motors are often mounted in proximity to other inductive components (e.g., pancake resolvers), and wiring to motor phases are often routed through slip ring connections. Low inductance generally desired of BLDC motors in such applications may require high PWM switching frequencies (e.g., due to the low L/R time constants) to avoid excessive heating (from ripple currents) in the motor windings.

The high PWM switching noise may cause a higher rate of current change through the motor windings, which may result in cross talk between components in proximity to (e.g., adjacent to) the BLDC motors via parasitic signals coupled from the BLDC motor's windings and any wires attaching to them to these components. To avoid such crosstalk, increased inductive and/or capacitive shielding may be required in such cases. In addition, the higher rate of current change may cause higher levels of electromagnetic interference (EMI) that impacts ability of a system that uses the BLDC motors to meet conducted and radiated emission standards.

For example, a gimbal used to move sensitive equipment, such as video equipment, may couple signals from the motor windings to video signals of the video equipment, thus decreasing quality of the video signals. To avoid crosstalk due to the switching noise, additional shielding may be deployed to avoid stray inductive coupling, thus occupying space and increasing component cost. In many cases, at higher switching frequencies, the higher PWM switching noise of the BLDC motors cannot be adequately minimized to a level necessary to maintain typical performance (e.g., gimbal or pan/tilt performance) achieved with brushed motors.

Therefore, there is a need to provide improved ways to facilitate control of electric motors.

SUMMARY

In accordance with various embodiments further discussed herein, systems and methods for controlling an electric motor are provided that utilize variable generator circuits operated, for example, with switching power supplies to provide variable electrical signals. In various embodiments, the variable generator circuits may be implemented by variable voltage generator circuits, variable current generator circuits, and/or other circuits as appropriate. The variable generator circuits may provide corresponding first and second electrical signals based on one or more common generator control signals which may be used to adjust the variable electrical signals to power the electric motor and, consequently, adjust the speed of the electric motor. The electrical signals provided by the variable generator circuits may include voltage signals, current signals, and/or generally any other type of electrical signal. Similarly, the generator control signals provided to the variable generator circuits may include voltage signals, current signals, and/or generally any other type of electrical signal. Advantageously, such an approach does not rely on PWM control signals directly provided to a switching circuit of the electric motor, thus reducing noise and interference associated with PWM switching.

In one or more embodiments, a system includes a brushless direct current motor that includes a rotor and a plurality of windings, where the rotor is configured to rotate with an adjustable angular speed. The system further includes a plurality of switching regulators, where each of the switching regulators is configured to generate a respective electrical drive signal based on a torque control signal. The angular speed of the rotor is based on the electrical drive signals. The system further includes a commutation logic circuit configured to selectively provide the electrical drive signals of the switching regulators to the windings based on a position of the rotor.

In one or more embodiments, a method includes determining a position of a rotor of a brushless direct current motor, where the rotor is configured to rotate with an adjustable angular speed. The method further includes generating, by each of a plurality of switching regulators, a respective electrical drive signal based on a torque control signal, where the angular speed of the rotor is based on the electrical drive signals. The method further includes selectively providing the electrical drive signals of the switching regulators to windings of the BLDC motor based on the position of the rotor. The method further includes rotating the rotor in response to the electrical drive signals.

In one or more embodiments, a system includes an electric motor that includes a rotor and a plurality of windings, where the rotor is configured to rotate with an adjustable angular speed. The system further includes a first variable generator circuit configured to generate a first electrical signal in response to a generator control signal. The system further includes a second variable generator circuit configured to generate a second electrical signal in response to the generator control signal. The angular speed of the rotor is based on the first and second electrical signals. The system further includes a commutation logic circuit configured to generate a plurality of switch control signals based at least in part on a position of the rotor. The system further includes a switching circuit configured to selectively couple at least one of the windings with the first and second variable generator circuits in response to the switch control signals.

In one or more embodiments, a method includes generating a plurality of switch control signals based at least in part on a position of a rotor of an electric motor. The method further includes selectively coupling, by a switching circuit, at least one winding of the electric motor with first and second variable generator circuits in response to the switch control signals. The method further includes generating, by the first variable generator circuit, a first electrical signal in response to a generator control signal. The method further includes generating, by the second voltage generator circuit, a second electrical signal in response to the same generator control signal. The method further includes passing a current between the first and second variable generator circuits through the at least one winding, where the current is based on the first and second electrical signals. The method further includes rotating the rotor in response to the current.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
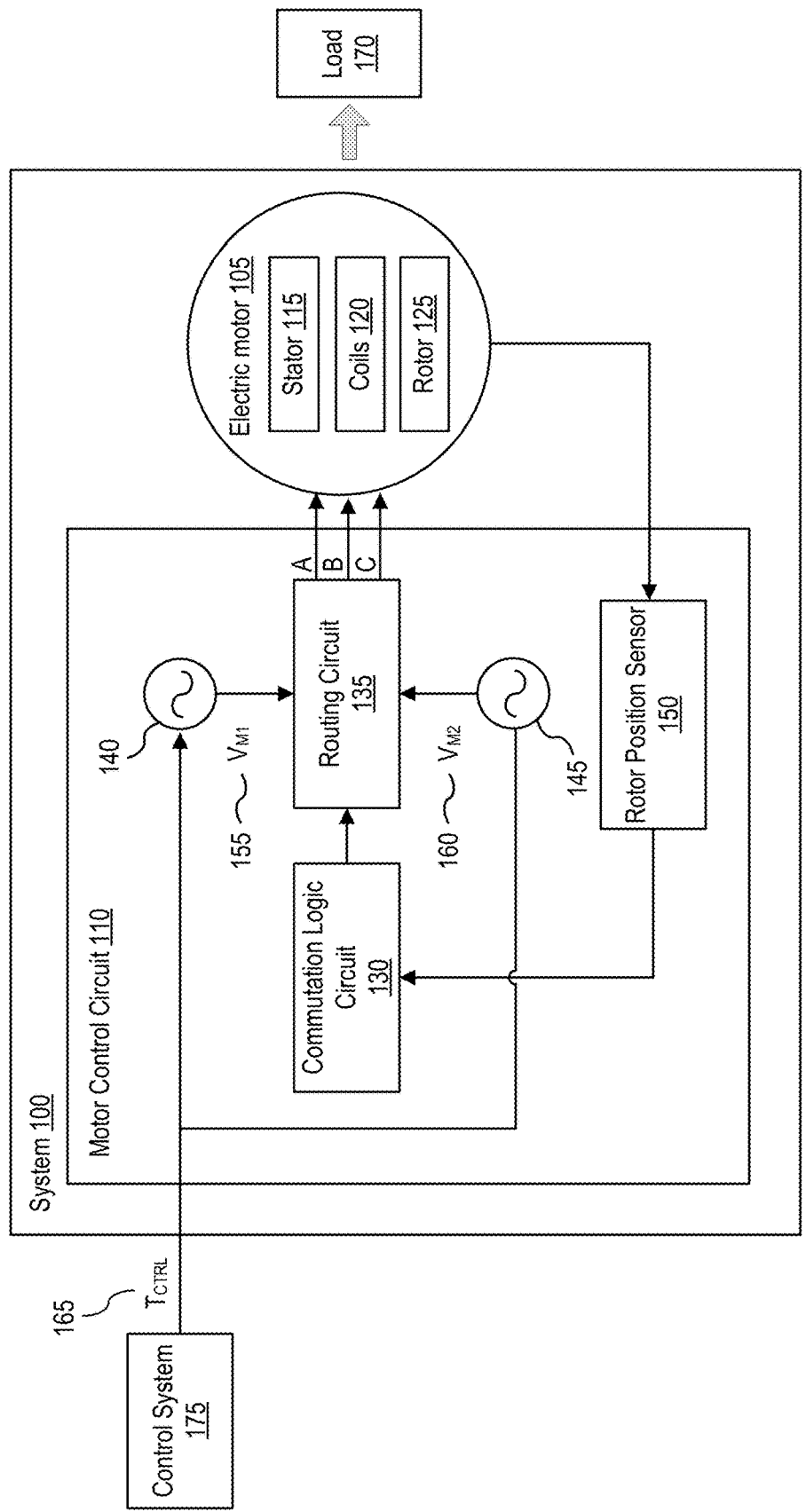
FIG. 1 illustrates a block diagram of a system for facilitating control of an electric motor in accordance with an embodiment of the present disclosure.

Various techniques are provided to facilitate control of an electric motor. In an embodiment, an electric motor system includes an electric motor and a motor control circuit. The electric motor includes a stator, coils (e.g., also referred to as motor coils), and a rotor. One or more of the coils of the electric motor are used (e.g., coupled) together to collectively provide windings through which current passes. For example, in an embodiment, current may be passed through at least two coupled coils, which collectively provide a winding to pass current in either direction. In some cases, the coils are wound about the stator. In such cases, the coils may be referred to as stator coils.

The rotation of the rotor provides a torque that the electric motor can apply to a load coupled to the electric motor. The torque can be utilized to cause rotational motion and/or translational motion of the load and/or otherwise provide mechanical energy to the load. The electric motor may be utilized in gimbal platforms, servo motors, devices with pan/tilt capability, automobiles, industrial turbines, washing machines, robots, and/or generally any system that may utilize an electric motor for converting electrical energy to mechanical energy.

The motor control circuit includes variable generator circuits (e.g., switching regulator circuits) and a commutation logic circuit. Each variable generator circuit generates electrical drive signals that may be provided to the electric motor (e.g., the windings of the electric motor) to cause rotation of the rotor. In this regard, the angular speed of the rotor may be dependent on the electrical signals applied to the electric motor. In some embodiments, the variable generator circuits are variable voltage generator circuits and the electrical drive signals are voltages (e.g., DC or substantially DC voltage, sinusoidal or substantially sinusoidal voltage). In other embodiments, the variable generator circuits may be variable current generator circuits (e.g., current sources) and the electrical drive signals may be currents.

The electrical drive signals may be based at least in part on an adjustable control signal. The adjustable control signal may be provided in response to a user command (e.g., through operation of an appropriate user interface) or in response to an autonomous control system. By way of non-limiting example, the control signal may be provided as a voltage, current, or digital signal representative of or generated by converting (e.g., using an analog-to-digital converter) a voltage or current. In some cases, the control signal may be used to set a torque applied by the electric motor on the load, or equivalently the control signal may be used to set a rotational speed of the electric motor. In these cases, the control signal may be referred to as a torque control signal or a torque command signal.

The commutation logic circuit selectively provides the electrical drive signals generated by the variable generator circuits to the windings based on a position of the rotor. In this regard, for example, the commutation logic circuit may generate control signals that affect the routing (e.g., the coupling) of the electrical drive signals to the windings of the electric motor. The position of the rotor may be an orientation (e.g., physical rotation orientation) of the rotor with respect to the coils of the electric motor.

In a first approach to facilitate control of an electric motor, the motor control circuit may include a routing circuit (e.g., also referred to as a switching circuit). The commutation logic circuit generates routing control signals (e.g., also referred to as switch control signals) for the commutation process associated with operation of the electric motor. In response to the routing control signals, the windings of the electric motor may be selectively coupled by the switching circuit to first and second variable generator circuits. In this regard, the switching circuit may selectively couple at least one winding (e.g., each winding provided by two or more coupled coils) with the variable generator circuits in response to the switch control signals. The switching circuit may include switches that can be turned on or off based on logic levels (e.g., logic low, logic high) of corresponding switch control signals. In this regard, the switching circuit may include gate drivers that are responsive to logic levels (e.g., states, values) of the switch control signals, and generate appropriate voltages to drive (e.g., turn on, turn off) the switches in response to the switch control signals. The switch control signals and associated driver voltages may be non-pulse width modulation (non-PWM) signals maintained at fixed voltages while coupling the winding(s) to the variable generator circuits.

The switch control signals for effectuating the commutation process may be generated by the commutation logic circuit in response to the position of the rotor of the electric motor and maintained at fixed signal levels (e.g., fixed voltages and/or fixed currents) while coupling at least one winding to the first and second variable generator circuits. The switch control signals may be implemented as voltages. In some embodiments, the switch control signals may be provided as six-step commutation signals (e.g., for effectuating trapezoidal phase voltages).

Corresponding first and second electrical drive signals are generated by the first and second variable generator circuits in response to a control signal (e.g., a torque control signal). The rotor of the electric motor rotates in response to current passed through the coupled winding(s). To change the rotation speed of the rotor, the first and second electrical drive signals may be adjusted. The change in the rotation speed may be effectuated by appropriate adjustment of the torque control signal. In some embodiments, the torque control signal (e.g., provided as or converted into a voltage), or a scaled and/or offset version thereof, may be coupled into (e.g., injected into) a feedback loop of the first and second variable generator circuits to cause appropriate electrical drive signals to be generated by the variable generator circuits.

In a second approach to facilitate control of an electric motor, the commutation logic circuit may determine motor phase control signals (e.g., also referred to as motor phase command signals) based on the position of the rotor and the variable generator circuits may generate electrical drive signals to be applied to the windings of the electric motor based on the motor phase control signals. The motor phase control signals may be implemented as voltages. In some embodiments, the commutation logic circuit may couple the motor phase control signals to (e.g., inject the motor phase control signals into) a feedback loop of the variable generator circuits to cause appropriate electrical drive signals to be generated by the variable generator circuits In some embodiments, the motor phase control signals may be provided as sinusoidal commutation signals.

The motor phase control signals may be based on values retrieved from a lookup table based on the position of the rotor. In some cases, the motor phase control signals may be based on the values from the lookup table scaled by a torque control signal. As previously indicated, the torque control signal on which may be provided in response to a user command (e.g., through operation of an appropriate user interface) or in response to an autonomous control system. In some embodiments, the lookup table may include values for sinusoidal functions. In these embodiments, the motor phase control signals (e.g., provided as input to the variable generator circuits) and the electrical drive signals (e.g., provided as output by the variable generator circuits) may be sinusoidal waves if the electric motor is rotating. As such, as the electric motor is rotating, the variable generator circuits may directly apply a smooth, continuous sinusoidal signal to the electric motor (e.g., the windings of the electric motor).

In both approaches, in coupling the winding(s) of the electric motor to the variable generator circuits, the rotor may rotate (e.g., produce torque) in response to a current passed through (e.g., applied to) the coupled winding(s). As discussed, each winding can be implemented by two or more coils which pass the current associated with the winding. In some embodiments, as the electric motor rotates, the variable generator circuits are variable voltage generator circuits and the electrical drive signals are voltages (e.g., DC or substantially DC voltage, sinusoidal or substantially sinusoidal voltage). The current (e.g., current magnitude and direction) is based on a voltage difference between a voltage (e.g., an electrical drive voltage) provided by one variable voltage generator circuit and a voltage provided by another variable voltage generator circuit. In some cases, the current is a DC or substantially DC current (e.g., in the first approach) or sinusoidal or substantially sinusoidal (e.g., in the second approach), and thus is continuous with little or no EMI effects.

In the first approach, the coupling of different windings to the variable generator circuits implement (e.g., cycle through) different commutation states of the electric motor system. In this regard, each commutation state may be defined by a respective range of positions of the rotor and a respective set of coils coupled together to provide the winding(s) of the electric motor coupled to the variable voltage generator circuits. The voltage provided by the variable voltage generator circuits may be based on a common (e.g., shared) torque control signal provided to the variable voltage generator circuits. The torque control signal may be provided as a voltage.

In the second approach, different commutation states may be effectuated as the commutation logic circuit generates different sets of motor phase control signals in response to changes in the rotor position. In this regard, the commutation logic circuit sweeps through the entries of the lookup table and generates corresponding sets of motor phase control signals as the rotor position rotates. In general, current continuously passes through all the windings of the electric motor in the second approach.

In some embodiments, the variable generator circuits may be or may include switching regulators. The switching regulators may utilize PWM to generate output voltages based on a supply voltage $V_{CC}$. In some cases, frequencies associated with the switching regulators may be in the MHz range. Inductor(s) and capacitor(s) of the switching regulators may provide an LC filter to smooth out voltages and reduce or avoid noise (e.g., ripple voltages) and provide output voltages that are DC or substantially DC. The DC-DC conversion nature may allow for flexible input voltage requirements, e.g. receiving and converting a wide range of possible input voltages. In some cases, high switching PWM operations associated with the switching regulators may be provided at a distance away from the electric motor. For example, the switching regulators may be on a separate chip that outputs a DC or substantially DC voltage.

By utilizing filtering provided by the variable voltage generator circuits, motor control performance, including commutation of the electric motors, may be substantially independent (e.g., substantially decoupled) from resistance and/or inductance of the motor windings. In this regard, the electric motor's resistance and inductance are not required to perform filtering of PWM signals (e.g., in contrast to conventional PWM approaches in which high PWM switching frequencies are applied to the electric motor's windings, thus increasing switching noise inadvertently coupled to adjacent circuitry).

Thus, using various embodiments, electric motors (e.g., BLDC motors) may be provided with a continuous drive to the motor windings that reduces or avoids noise present in conventional PWM drive while allowing for power efficiencies similar to or exceeding PWM drive techniques. The continuous drive to the motor windings may be DC or substantially DC (e.g., in the first approach) or sinusoidal or substantially sinusoidal (e.g., in the second approach). Low inductance, high performance electric motors in accordance with an embodiment may be provided in applications with strict EMI noise sensitivity requirements and/or space constraints (e.g., gimbals, pan/tilt products, and/or servo motor applications). The electrical motor system topology may be scalable to accommodate small to large motor applications.

In an embodiment, the various techniques for facilitating control of electric motors may be used with low inductance electric motors. A low inductance electric motor may have an inductance of around 10 μH to around 20 μH. In some cases, to implement a low inductance electric motor, ironless composite stators and/or high energy, lightweight rotors may be utilized. Low inductance motors may have decreased weight, higher performance superior MTBF and/or lower cost compared with brushed motors currently used for a given package size. In other embodiments, dependent on application, electric motors with higher inductances, such as in the tens of mH or higher, may be utilized (e.g., sufficient).

In an embodiment, the various techniques for facilitating control of electric motors may be used with BLDC motors (e.g., low inductance BLDC motors). In some cases, such as in gimbals and/or devices with pan/tilt capability, BLDC motors may have advantages over brushed motors, such as in the area of MTBF, weight, cost, and/or performance for a given size. Lack of brush wear in brushless motors may facilitate applications that may involve constant scanning. For example, the brushless motors may be utilized in maritime applications, in which a gimbal(s) may be scanned back and forth along an azimuth axis for extended periods of time.

Although various aspects of electric motor systems are discussed herein with regard to voltages, other types of electrical signals (e.g., currents) and related circuitry may be used alternatively and/or in addition to voltages. For example, in some embodiments, variable generator circuits and their generated electrical signals may be implemented as variable voltage generator circuits and voltages, variable current generator circuits and currents, and/or other circuits and signals as appropriate. Similarly, control systems and control signals may be implemented as voltage control systems and voltage control signals, current control systems and current control signals, and/or other types of systems and signals. Also, routing control signals may be implemented as voltage control signals, current control signals, and/or other types of signals. In some embodiments, different types of electrical drive signals may be used in the same system. For example, in some cases, the first variable generator circuit may generate a voltage signal in response to a torque control signal and the second variable generator circuit may generate a current signal in response to the same torque control signal.

Turning now to the figures, FIG. 1 illustrates a block diagram of a system 100 for facilitating control of an electric motor in accordance with an embodiment of the present disclosure. The system 100 may be utilized to provide torque to a load 170. The system 100 includes an electric motor 105 and a motor control circuit 110. In an embodiment, the electric motor 105 may be, may include, or may be a part of, a BLDC motor. The electric motor 105 includes a stator 115, coils 120, and a rotor 125. The stator 115, coils 120, and rotor 125 may be within a housing of the electric motor 105. In some cases, the stator 115 includes structural elements (e.g., poles) about which the coils 120 may be wound. The rotor 125 may include one or more permanent magnetics that are rotatable in response to a magnetic field. In some embodiments, the system 100 utilizes six-step commutation signals for effectuating control of the electric motor 105.

The motor control circuit 110 includes a commutation logic circuit 130, routing circuit 135, variable voltage generator circuit 140, and variable voltage generator circuit 145, and rotor position sensor 150. The motor control circuit 110 selectively energizes windings provided by at least two of the coils 120. The commutation logic circuit 130 generates routing control signals based at least in part on a position of the rotor 125. The routing control signals may also be referred to as switch control signals. In some cases, the position of the rotor 125 may be an orientation of the permanent magnet(s) of the rotor 125 with respect to the coils 120. In some embodiments, the routing control signals may be provided as six-step commutation signals.

The switch control signals may be coupled to the routing circuit 135. In response to the switch control signals, the routing circuit 135 selectively couples the coils 120 to the variable voltage generator circuits 140 and 145 to enable current to be passed through the winding provided by the coupled coils. In an embodiment, the routing circuit 135 includes switches, where each switch turns on or off based on a corresponding switch control signal. In this regard, the routing circuit 135 may include drivers that are responsive to logic levels of the switch control signals, and generate appropriate voltages in response to the switch control signals to drive the switches. The current passed through the winding is produced by a voltage difference between a voltage 155 (denoted as $V_{M1}$) generated by the variable voltage generator circuit 140 and a voltage 160 (denoted as $V_{M2}$) generated by the variable voltage generator circuit 145. The voltage 155 and 160 may be referred to as an electrical drive signal generated by the variable voltage generator circuit 140 and 145, respectively.

The variable voltage generator circuits 140 and 145 generates the voltages 155 and 160, respectively, based on a torque control signal 165 (denoted as $T_{CTRL}$) received from a control system 175. In an embodiment, the torque control signal 165 may be provided as a voltage. The torque control signal 165 may be used to set a torque applied by the electric motor 105 on the load 170, or equivalently the torque control signal 165 may be used to set a rotational speed of the electric motor 105. In some cases, an adjustment to the torque control signal 165 may cause one of the voltages 155 or 160 to increase and the other to decrease. In these cases, the voltages 155 and 160 may be referred to as a differential pair of complementary voltages or anti-phase voltages. In some cases, the rotor 125 rotates in a first direction (e.g., clockwise direction) when $V_{M1} > V_{M2}$ and rotates in a second direction (e.g., counterclockwise direction) when $V_{M2} > V_{M1}$.

In an embodiment, the variable voltage generator circuits 140 and/or 145 may utilize PWM to generate their respective voltages. The variable voltage generator circuits 140 and 145 generally receive power from another power supply. The variable voltage generator circuits 140 and/or 145 may include buck regulators, single-ended primary-inductor converters (SEPICs), Ćuk converters, boost converters, buck-boost converters, other DC-DC converters, and/or generally any voltage generator circuit capable of receiving the torque control signal 165 and generate desired motor winding voltages.

In some cases, the torque control signal 165 may be a parameter whose value can be adjusted autonomously by the control system 175 and/or adjusted manually by a user via the control system 175. The control system 175 may autonomously adjust the torque control signal 165 in response to operation conditions of the system 100 or a system that includes the system 100 (e.g., a gimbal system). For example, weather conditions (e.g., rain, snow) may indicate that the electric motor 105 needs to apply higher torque to the load 170. The control system 175 may provide user controls (e.g., buttons, switches, and/or dials) to allow manual adjustment of the torque control signal 165. In some cases, the user controls may include a keyboard, virtual keyboard, touch screen, mouse, and/or other input device or capability provided to the user to allow the user to set or adjust the torque control signal 165. In some cases, the user may send an instruction to the torque control system 175 to adjust the torque control signal 165 remotely, e.g. via an interface (e.g., website, application) provided to allow the user to control the torque control signal 165 and accessible to the user via a user device (e.g., mobile phone, remote controller).

The rotor position sensor 150 determines a position of the rotor 125 and generates a rotor position signal based on the determined position. In some cases, the position of the rotor 125 may be an orientation (e.g., physical rotation orientation) of a permanent magnet of the rotor 125 with respect to the coils 120. The rotor position sensor 150 may include Hall effect sensors, back electromotive force (EMF) zero-crossing detectors, encoders, and/or generally any other devices that can generate information indicative of the position of the rotor 125. For example, the rotor position sensor 150 may include three Hall effect sensors mounted to the electric motor 105.

During operation of the electric motor 105, when a current flows through windings provided by coupled coils (e.g., each winding provided by a coupling of a subset of the coils 120), the windings produce, in response to the current, a magnetic field that couples to the rotor 125. The magnetic field exerts a torque on the rotor 125 and causes the rotor 125 to rotate. In this regard, the rotor 125 produces a torque of the electric motor 105 and the windings supply a magnetic field that drives the rotation of the rotor 125. The torque provided by the rotor 125 may be utilized to drive the load 170 coupled to the electric motor 105. The torque can be utilized to cause rotational motion and/or translational motion to the load 170 and/or otherwise provide mechanical energy to the load 170. The commutation logic circuit 130 may generate and provide switch control signals to the routing circuit 135 to sequentially and selectively activate (e.g., pass current through) a subset of the coils 120 such that the permanent magnet(s) of the rotor 125 continuously rotates to align (e.g., follow) the magnetic field generated by activated coils. The activated coils collectively provide the windings of the electric motor 105 through which current passes. In other words, the coils 120 are selectively activated to cause the rotor 125 to continuously rotate and produce torque of the electric motor 105 during operation of the electric motor 105.

A commutation process (also referred to as a commutation sequence) defines a set of commutation states effectuated by the motor control circuit 110 to selectively couple the coils 120 (e.g., couple a subset of the coils 120) to the variable voltage generator circuits 140 and 145 in response to the switch control signals. In this regard, each commutation state may be defined by a respective range of positions of the rotor 125 and a respective subset of the coils 120 to be coupled. In some cases, for a commutation state, at least two coils are coupled to provide a winding of the electric motor 105. Thus, each commutation state may also be referenced by respective winding(s) provided by coupled coils. The rotor position signal provided by the rotor position sensor 150 may be utilized to maintain proper timing of the commutation states of the commutation process.

In an embodiment, one or more of the commutation logic circuit 130, variable voltage generator circuits 140 and/or 145, rotor position sensor 150, and/or voltage control system 175 may include and/or may be implemented as one or more microprocessors, microcontrollers, application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), codecs, and/or other processing devices. The various components 130, 140, 145, 150, and 175 may include memory for storing instructions and other information for facilitating control of electric motors.

Figure 2:
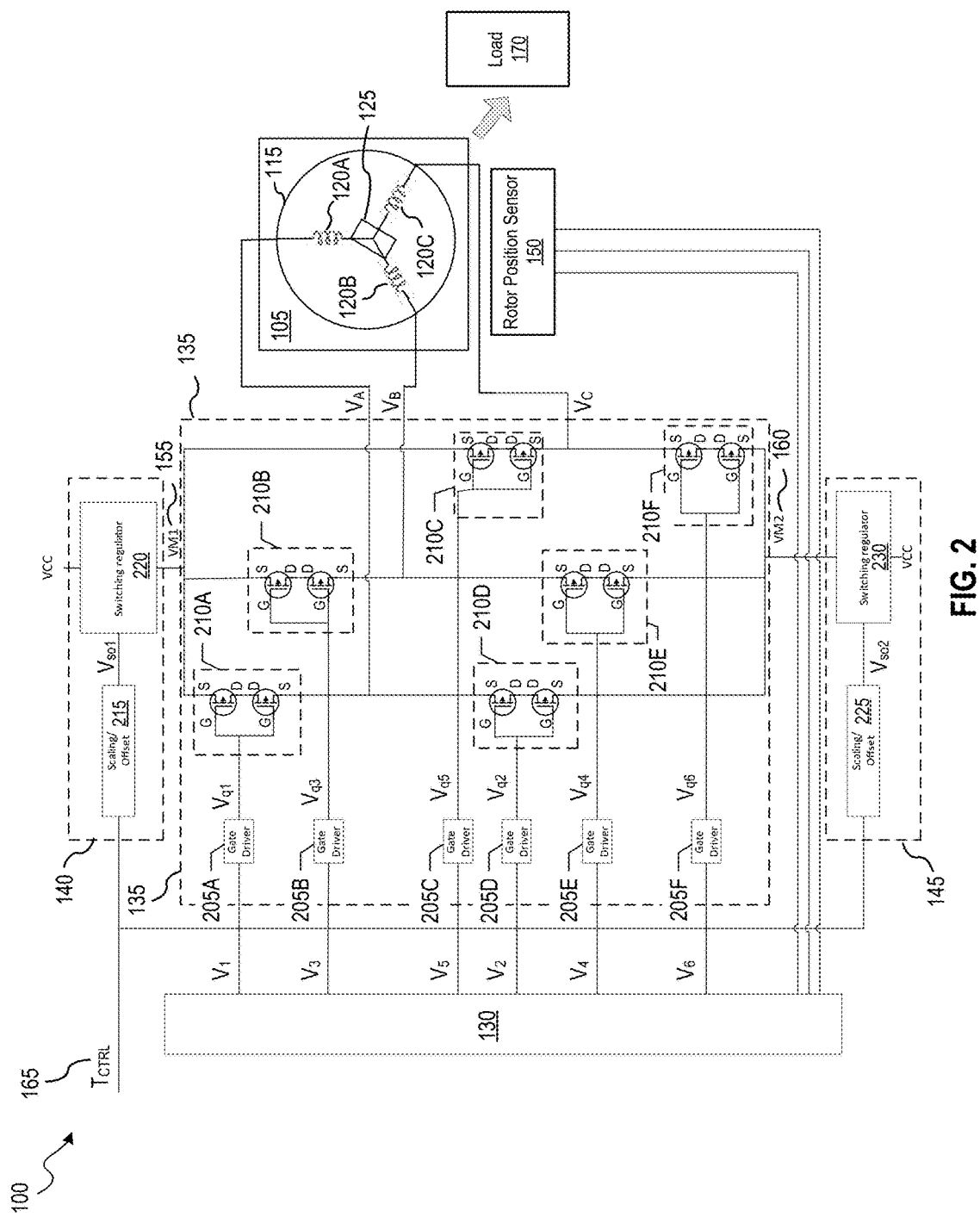
FIG. 2 illustrates a schematic diagram of a system for facilitating control of an electric motor in accordance with an embodiment of the present disclosure.

FIG. 2 illustrates a schematic diagram of the system 100 for facilitating control of an electric motor in accordance with an embodiment of the present disclosure. The system 100 includes the electric motor 105, commutation logic circuit 130, routing circuit 135, variable voltage generator circuits 140 and 145, and rotor position sensor 150. The electric motor 105 includes the stator 115, coils 120A-C, and rotor 125. In some embodiments, current may be passed through at least two of the coils 120A-C, with the coupled coils collectively providing windings of the electric motor 105 through which current may flow in either direction. With three coils and each coil allowing current to flow in both directions, the coils 120A-C collectively provide six windings of the electric motor 105. For example, in the embodiment illustrated in FIG. 2, windings may be provided by combinations of coils 120A/120B, 120A/120C, and 120B/120C.

Although the coils 120A-C of FIG. 2 are in a three-phase wye configuration, a delta configuration, two-phase bifilar wound configuration, or generally any single- or multi-phase configurations may be utilized. In addition, although FIG. 2 illustrates an electric motor with three coils, electric motors may include fewer or more than three coils.

The routing circuit 135 includes gate drivers 205A-F (e.g., buffers, amplifiers) and switching devices 210A-F. The commutation logic circuit 130 may generate switch control signals $V_1$ through $V_6$ based on a position of the rotor 125 (e.g., a present commutation state). For example, the commutation logic circuit 130 may receive a rotor position signal(s) from the rotor position sensor 150. The switch control signals $V_1$ through $V_6$ may be buffered or amplified by the gate drivers 205A through 205F, respectively, and provided by the gate drivers 205A through 205F as voltages $V_{q1}$ through $V_{q6}$ to the switches 210A-F. In this regard, in response to the switch control signals, the gate drivers 205A-F generate appropriate voltages to drive the switches 210A-F (e.g., drive gates of the switches 210A-F). In some cases, the switch control signals $V_1$ through $V_6$ may be applied directly to the corresponding switches 210A through 210F, e.g. with or without intervening gate drivers. In such cases, for instance, gate drivers are provided as part of the commutation logic circuit 130. Thus, as used herein, the switch control signals may refer to $V_1$ through $V_6$ or $V_{q1}$ through $V_{q6}$.

The switches 210A-F are turned on or off based on corresponding switch control signals, e.g. based on appropriate voltages generated by the gate drivers 205A-F in response to the switch control signals. The switches 210A-F may be or may include back-to-back coupled transistors that share a common gate node and a common source/drain node. The back-to-back configuration of the transistors may reduce or eliminate parasitic diode paths (e.g., parasitic intrinsic diode paths) that generally adversely affect commutation. In contrast, for a single transistor, its parasitic intrinsic diode may provide a parasitic current path that can couple into the electric motor 105. As an example, as shown in FIG. 2, the switches 210A-F may be p-channel transistors, such as p-type metal-oxide-semiconductor field-effect transistors (PMOSFETs), that share a common gate node and a common drain node. In FIG. 2, the gate nodes, drain nodes, and source nodes of transistors of the switches 210A-F are denoted by a G, D, and S, respectively. As another example, the switches 210A-F may be n-channel transistors, such as n-type MOSFETs (NMOSFETs), that share a common gate node and a common source node. Alternatively or in addition to transistors, other types of switching devices or switching mechanisms, such as thyristors, silicon controller rectifiers (SCRs), reed relays, solid state relays, and/or generally any kind of electrically controlled bidirectional switch can be used to implement the routing circuit 135.

The variable voltage generator circuit 140 includes a scaling/offset circuit 215 and a switching regulator circuit 220. The variable voltage generator circuit 145 includes a scaling/offset circuit 225 and a switching regulator circuit 230. The scaling/offset circuits 215 and 225 may generate voltages $V_{so1}$ and $V_{so2}$, respectively, appropriate to drive the switching regulator circuits 220 and 230 based on the torque control signal 165. In some cases, the torque control signal 165 may be provided as a voltage control signal $V_{CTRL}$. In these cases, as an example, the scaling/offset circuits 215 and 225 may generate a voltage $V_{so1}$=m $V_{CTRL}$ b and $V_{so2}$=−m $V_{CTRL}$ b, respectively, where m and b may be set based on application. In this example, if m=3, b=1, and $V_{CTRL}$=1.2 V, then $V_{so1}$=4.6 V and $V_{so2}$=−2.6 V. The voltage signals from the scaling/offset circuits 215 and 225 are then provided to the variable voltage generator circuits 140 and 145 to generate the voltages 155 and 160, respectively. In other cases, the torque control signal 165 may be any signal value that can be mapped by the scaling/offset circuits 215 and 225 to a voltage signal that can be provided to the switching regulator circuits 220 and 230. As such, a torque control signal may refer to $T_{CTRL}$ in FIG. 2 (e.g., provided as a voltage $V_{CTRL}$ in some cases) as well as scaled and/or offset versions of the torque control signal, such as the voltages $V_{so1}$ and $V_{so2}$ output from the scaling/offset circuits 215 and 225, respectively.

The switching regulator circuits 220 and 230 may be connected to and powered at least in part by a power supply (e.g., $V_{CC}$ power supply). The switching regulator circuits 220 and 230 may, but need not, share a common power supply. The switching regulator circuits 220 and 230 may generate the voltages 155 and 160 based at least on the voltages $V_{so1}$ and $V_{so2}$, respectively. In some cases, the voltages 155 and 160 can be varied in value from $V_L$ to $V_H$ based on the voltages $V_{so1}$ and $V_{so2}$, which in turn are controlled by the torque control signal 165. In some cases, the mapping between values of the torque control signal 165 and the voltages 155 and 160 provided by the switching regulator circuits 220 and 230 may be set and/or adjusted by the user and/or the manufacturer of the variable voltage generator circuits 140 and 145.

In a case that the torque control signal 165 is provided as the voltage $V_{CTRL}$, an example range of the torque control signal 165 may be around −10 V to around 10 V. Example ranges of $V_L$ and/or $V_H$ may be around −60 V to around +60 V. As an example, if $V_{CTRL}$=0 V, $V_{M1}$=$V_{M2}$. In this case, a net zero current passes through the winding(s) coupled to the variable voltage generator circuits 140 and 145, and the electric motor 105 does not produce torque (e.g., the rotor 125 does not rotate). As another example, if $V_{CTRL}$=10 V, $V_{M1}$=$V_L$=60 V and $V_{M2}$=$V_H$=0 V. In some cases, motor rotation polarity may be based on a polarity of the torque control signal 165. For instance, if $V_{CTRL}$=−10 V, $V_{M1}$=$V_H$=0 V and $V_{M2}$=$V_L$=60 V. In this regard, in some cases, $V_{CTRL}$=10 V may cause the torque produced by the electric motor 105 to be equal, but in an opposite direction, from $V_{CTRL}$=−10 V.

Although the foregoing describes the torque control signal 165 as being a voltage signal, the torque control signal 165 may generally be any signal (e.g., a digital signal) that indicates the voltages 155 and 160 to be provided by the variable voltage generator circuits 140 and 145. In one example, the torque control signal 165 may indicate one of multiple discrete torque settings (e.g., high torque, low torque, medium torque) to which the electric motor 105 may be set or adjusted. The discrete torque settings may be defined by the user and/or the manufacturer. Each torque setting may be associated with values for the voltages 155 and/or 160.

In an embodiment, the switching regulator circuits 220 and/or 230 utilize PWM to generate their respective voltages 155 and 160. A duty cycle of the respective PWM signals is proportional to the voltages $V_{so1}$ and $V_{so2}$ and determines a percentage of time that the switching element conducts and, in turn, the voltages 155 and 160. The PWM switching frequency may be in the MHz region.

The switching regulator circuits 220 and 230 may include a switch(es), a diode(s), an inductor(s), and/or input/output capacitors. The inductor(s) and capacitor(s) may effectively form an LC filter(s) smooth out voltages and reduce or avoid noise (e.g., ripple voltages, ripple currents), and provide output voltages (e.g., the voltages 155 and 160) that are DC or substantially DC. For instance, the ripple voltage may be a few millivolts for the voltages 155 and 160. As such, noise associated with switching frequencies may be filtered by the LC filter(s) of the switching regulator circuits 220 and/or 230, such that an inductance of the electric motor 105 is decoupled from (e.g., not part of) the filtering process. In some cases, by reducing the ripple voltage, the ripple current (e.g., a rate of change of current) through the coupled windings may be reduced. The ripple current may be based at least on a ratio of the generated voltage (e.g., $V_{M1}$, $V_{M2}$) to the inductance associated with the switching regulator circuits 220 and 230.

Thus, in some cases, the filtering provided by the switching regulator circuits 220 and 230 helps decouple the electric motor 105 (e.g., resistance and/or inductance of the electric motor 105) from being utilized to filter the voltages provided to the coils 120A-C. In addition, the switching regulator circuits 220 and 230 may be small in size, thus saving on chip real estate compared to larger voltage generators. In an embodiment, high switching action associated with the switching regulator circuits 220 and 230 may be provided at a distance away from the electric motor 105. For example, the switching regulator circuits 220 and/or 230 may be provided on a separate chip that provides the voltages 155 and 160, respectively.

Although the foregoing describes the variable voltage generator circuits 140 and 145 as including switching regulator circuits, in some applications (e.g., applications that allow for higher heat dissipation and/or larger sizes), the variable voltage generator circuits 140 and 145 may include other types of voltage generators, such as linear regulators and potentiometers.

Figure 3A:
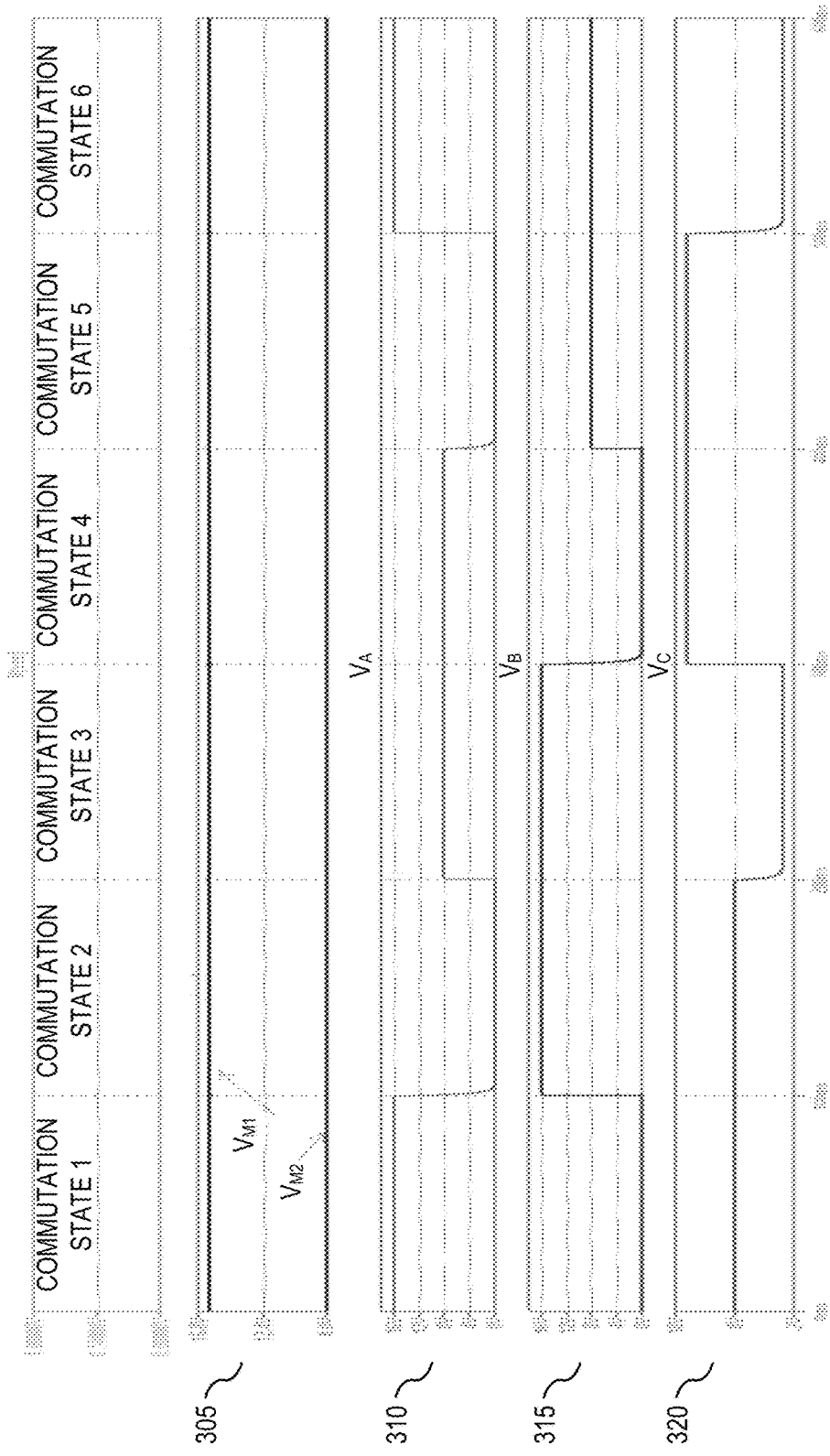
FIGS. 3A and 3B illustrate voltage diagrams for various nodes of an electrical motor system over different commutation states in accordance with an embodiment of the present disclosure.
Figure 3B:
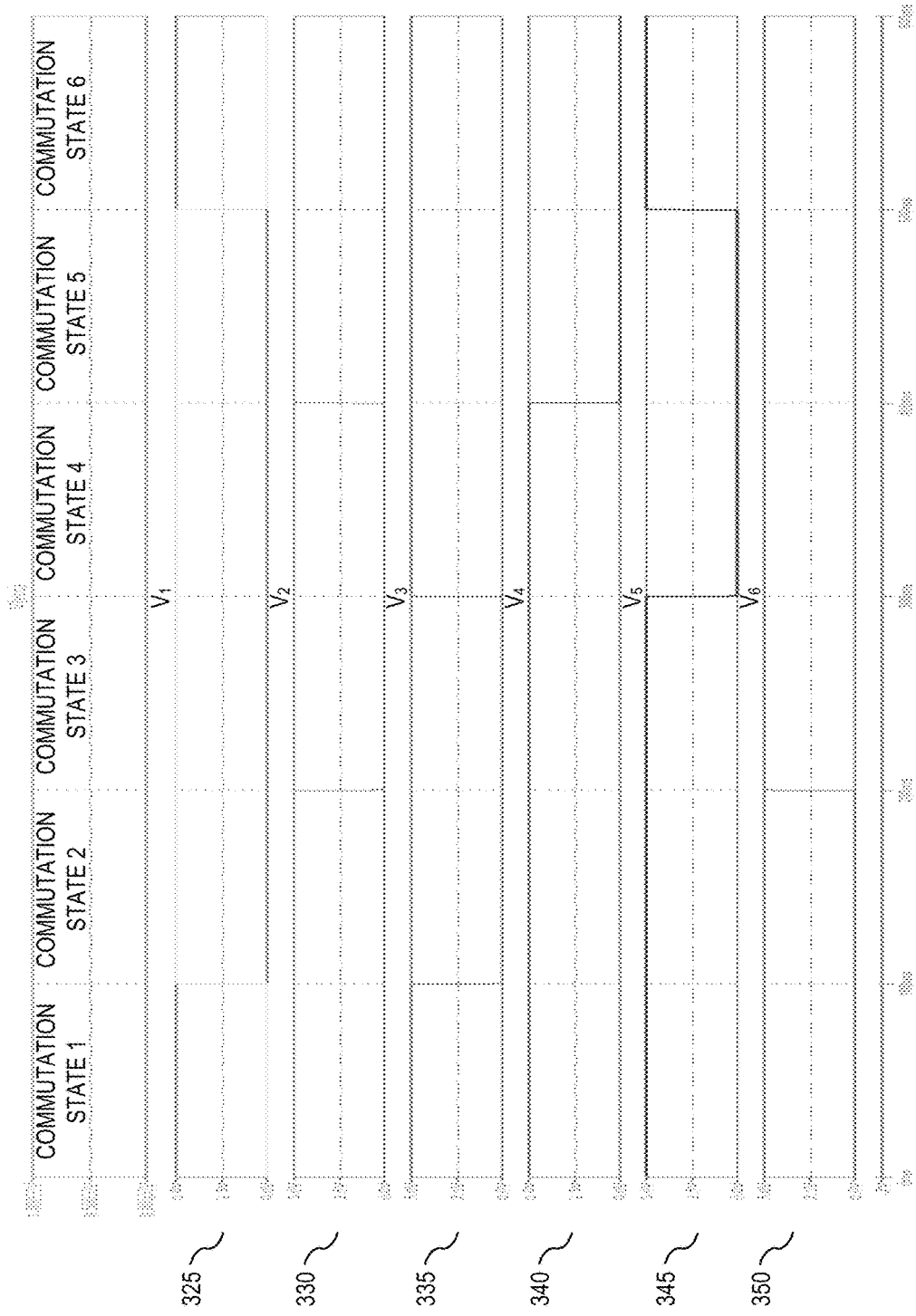

FIGS. 3A and 3B illustrate voltage diagrams for various nodes of the system 100 over different commutation states in accordance with an embodiment of the present disclosure. In an embodiment, the commutation logic circuit 130 generates switch control signals to be coupled to the switches 210A-F (e.g., via the gate drivers 205A-F) in accordance with the commutation process. FIGS. 3A and 3B are discussed with reference to FIG. 4. Although FIGS. 3A and 3B illustrate a six-step commutation process, a commutation process with more, fewer, and/or different commutation states may be utilized.

FIGS. 3A and 3B illustrate a six-step commutation process including commutation states 1 through 6, in which the rotation of the rotor 125 causes transitions from one commutation state to another commutation state around every 100 ms. It is noted that the index/identifier associated with each commutation state (e.g., 1, 2, etc.) is arbitrary and utilized for convenience (e.g., commutation state 1 does not necessarily identify an initial state of the electric motor 105).

FIG. 3A illustrates voltage diagrams 305, 310, 315, and 320. The voltage diagram 305 is of the voltages 155 (denoted as $V_{M1}$) and 160 (denoted as $V_{M2}$). In this regard, the voltages 155 and 160 remain at 16.0 V and 8.0 V, respectively, throughout the cycle through the six commutation states. The voltage diagrams 310, 315, and 320 are of the voltages applied to the coils 120A, 120B, and 120C (denoted as $V_a$, $V_b$, and $V_c$), respectively, for each of the commutation states. FIG. 3B illustrates voltage diagrams 325, 330, 335, 340, 345, and 350, which are of the switch control signals (denoted as $V_1$, $V_2$, $V_3$, $V_4$, $V_5$, and $V_6$).

Figure 4:
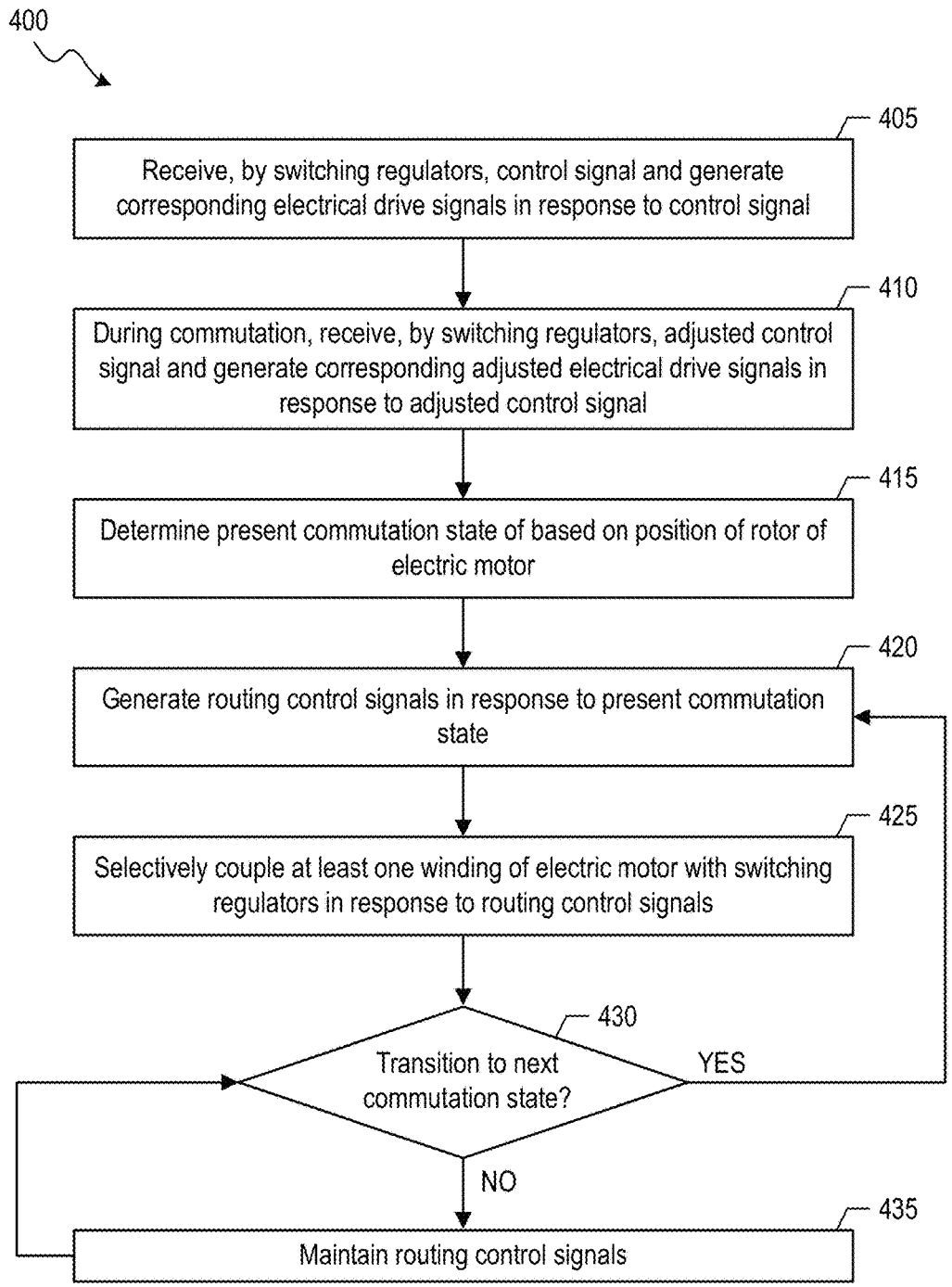
FIG. 4 illustrates a flow diagram of an example process for facilitating control of an electric motor in accordance with one or more embodiments of the present disclosure.

FIG. 4 illustrates a flow diagram of an example process 400 for facilitating control of electric motors in accordance with one or more embodiments of the present disclosure. For explanatory purposes, the example process 400 is described herein with reference to the example the system 100 and the voltage diagrams of FIGS. 3A and 3B. Note that one or more operations may be combined, omitted, and/or performed in a different order as desired.

At block 405, the variable voltage generator circuits 140 and 145 receive the torque control signal 165 and generate the voltages 155 and 160, respectively, in response to the torque control signal 165. The voltage 155 and 160 may be referred to as an electrical drive signal of the variable voltage generator circuit 140 and 145, respectively. At block 410, the torque control signal 165 may be adjusted during operation of the electric motor 105. For example, the control system 175 and/or a user may adjust the torque control signal 165 in order to effectuate an adjustment of (e.g., increase or decrease) the torque applied to the load 170. In this regard, the torque control signal 165 may be adjusted concurrently with the various operations shown in FIG. 4. In some cases, the torque control signal 165 may be adjusted such that the electric motor 105 rotates in a different direction. For example, the electric motor 105 may rotate in a first direction when the voltage 155 is greater than the voltage 160, and may rotate in a second direction when the voltage 155 is less than the voltage 160. When the voltages 155 and 160 are equal, the electric motor 105 does not rotate. In FIGS. 3A and 3B, the torque control signal 165 remains constant through an entire cycle of the commutation states, and thus the voltages 155 and 160 are maintained at fixed voltage levels (e.g., 16.0 V and 8.0 V, respectively).

In some cases, to increase the torque applied to the load 170 (e.g., increasing speed of rotation of the rotor 125), the torque control signal 165 may increase the voltage difference between the voltages 155 and 160. In various embodiments, the voltages 155 and 160 can be adjusted in opposite directions. In this regard, an adjustment to the torque control signal 165 may cause the variable voltage generator circuit 140 to increase the voltage 155 and the variable voltage generator circuit 145 to decrease the voltage 160, or vice versa. For example, prior to adjustment of the torque control signal 165, the voltages 155 and 160 may be 10 V and 6 V, respectively. After adjustment of the torque control signal 165, the voltages 155 and 160 may be 12 V and 4 V, respectively. As another example, prior to adjustment of the torque control signal 165, the voltages 155 and 160 may be 30 V and 0 V, respectively. After adjustment of the torque control signal 165, the voltages 155 and 160 may be 25 V and 2 V, respectively. In some embodiments, an adjustment of the torque control signal 165 may cause one of the voltages 155 and 160 to be adjusted while the other of the voltages 155 and 160 remains unchanged.

At block 415, the commutation logic circuit 130 determines a present commutation state of the system 100 based on a position of the rotor 125. In some cases, the position of the rotor 125 may be determined by the rotor position sensor 150. The rotor position sensor 150 may generate rotor position signals and provide these signals to the commutation logic circuit 130.

At block 420, the commutation logic circuit 130 generates the switch control signals $V_1$ through $V_6$ in response to the present commutation state. In this regard, the commutation logic circuit 130 may generate the switch control signals $V_1$ through $V_6$ based on the rotor position signals received from the rotor position sensor 150. In FIG. 2, the switch control signals $V_1$ through $V_6$ may be buffered or amplified by the gate drivers 205A through 205F, respectively, to provide gate driver voltages $V_{q1}$ through $V_{q6}$ that are appropriate for driving the switches 210A through 210F, respectively. As shown in FIG. 3B, the voltages $V_1$ through $V_6$ are driven to a logic high of 5.0 V or a logic low of 0 V depending a commutation state. In other cases, the switch control signals $V_1$ through $V_6$ may be applied directly to the corresponding switches 210A through 210F, e.g. with or without intervening gate drivers. In such cases, for instance, gate drivers are provided as part of the commutation logic circuit 130. Thus, as used herein, the switch control signals may refer to $V_1$ through $V_6$ or $V_{q1}$ through $V_{q6}$. The switch control voltages and associated gate driver voltages are non-pulse width modulation signals maintained at fixed voltages (e.g., 0 V or 5.0 V for the switch control signals) to allow selective coupling of the coils 120A-C to the variable voltage generator circuits 140 and 145. In an embodiment, when the switches 210A-F are p-channel transistors, the transistors are turned on in response to a logic low signal and turned off in response to a logic high signal.

At block 425, the routing circuit 135 selectively couples at least one winding (e.g., provided by coupling at least two of the coils 120A-C) with the variable voltage generator circuits 140 and 145 in response to the generated switch control signals. For example, when the present commutation state is in commutation state 1 depicted in FIGS. 3A and 3B, the switches 210A and 210F are in an on state whereas the remaining switches 210B-E are in an off state in response to the switch control signals $V_1$ through $V_6$. The switch 210A remains turned on (e.g., from a previous commutation state) and the switch 210F is turned on. The switches 210A and 210F couple the coils 120A and 120C to the variable voltage generator circuits 140 and 145. Such coupling allows a current produced by the voltage difference between the voltages 155 and 160 to pass between the variable voltage generator circuits 140 and 145 through a winding provided by the coils 120A and 120C. In commutation state 1, the voltage 155 (e.g., 16 V) is applied to the coil 120A through the switch 210A and the voltage 160 (e.g., 8 V) is applied to the coil 120C through the switch 210F. The voltages 155 and 160 are not applied to the coil 120B.

At block 430, the commutation logic circuit 130 determines whether to transition to a next commutation state based on the position of the rotor 125. For example, the rotor position sensor 150 may determine the position of the rotor 125 (e.g., as the rotor 125 rotates) and generate a rotor position signal based on the position of the rotor 125. Each commutation state may be associated with a respective range of positions of the rotor 125. When a determination is made not to transition to the next commutation state, the commutation logic circuit 130 maintains the switch control signals $V_1$ through $V_6$ at block 435. The process 500 proceeds to block 430 and continues to determine whether to transition to the next commutation state based on the position of the rotor 125.

When a determination is made to transition to the next commutation state, the commutation logic circuit 130 generates the switch control signals $V_1$ through $V_6$ in response to the next commutation state at block 420. For example, when the present commutation state is commutation state 1, the next commutation state is commutation state 2 depicted in FIGS. 3A and 3B. In this regard, in an embodiment, when $V_{M1} > V_{M2}$ (as shown in FIGS. 3A and 3B), the system 100 transitions, in sequence, through commutation states 1 through 6, transitions back to commutation state 1 upon completion of commutation state 6, and restarts the commutation sequence. When $V_{M2} > V_{M1}$, the system 100 transitions in the reverse sequence (e.g., from commutation state 6 through 1).

In commutation state 2, the switches 210B and 210F are in an on state whereas the remaining switches 210A and 210C-E are in an off state based on a state (e.g., value, logic level) of the corresponding switch control signals $V_1$ through $V_6$. The switch 210F remains turned on (e.g., from commutation state 1) and the switch 210B is turned on. The switches 210B and 210F couple the coils 120B and 120C to the variable voltage generator circuits 140 and 145. Such coupling allows a current produced by the voltage difference between the voltages 155 and 160 to pass between the variable voltage generator circuits 140 and 145 through a winding of the electric motor 105 provided by the coils 120B and 120C. In commutation state 2, the voltage 155 is applied to the coil 120B through the switch 210B, the voltage 160 is applied to the coil 120C through the switch 210F, and the voltages 155 and 160 are not applied to the coil 120A.

In commutation state 3, the switches 210B and 210D are in an on state whereas the remaining switches 210A, 210C, and 210E-F are in an off state based on a state of the corresponding switch control signals $V_1$ through $V_6$. The switch 210B remains turned on (e.g., from commutation state 2) and the switch 210D is turned on. The switches 210B and 210D couple the coils 120B and 120A to the variable voltage generator circuits 140 and 145. Such coupling allows a current produced by the voltage difference between the voltages 155 and 160 to pass between the variable voltage generator circuits 140 and 145 through a winding of the electric motor 105 provided by the coils 120B and 120A. In commutation state 3, the voltage 155 is applied to the coil 120B through the switch 210B, the voltage 160 is applied to the coil 120A through the switch 210D, and the voltages 155 and 160 are not applied to the coil 120C.

In commutation state 4, the switches 210C and 210D are in an on state whereas the remaining switches 210A-B and 210E-F are in an off state based on a state of the corresponding switch control signals $V_1$ through $V_6$. The switch 210D remains turned on (e.g., from commutation state 3) and the switch 210C is turned on. The switches 210C and 210D couple the coils 120C and 120A to the variable voltage generator circuits 140 and 145. Such coupling allows a current produced by the voltage difference between the voltages 155 and 160 to pass between the variable voltage generator circuits 140 and 145 through a winding of the electric motor 105 provided by the coils 120C and 120A. In commutation state 4, the voltage 155 is applied to the coil 120C through the switch 210C, the voltage 160 is applied to the coil 120A through the switch 210D, and the voltages 155 and 160 are not applied to the coil 120B.

In commutation state 5, the switches 210C and 210E are in an on state whereas the remaining switches 210A-B, 210D, and 210F are in an off state based on a state of the corresponding switch control signals $V_1$ through $V_6$. The switch 210C remains turned on (e.g., from commutation state 4) and the switch 210E is turned on. The switches 210C and 210E couple the coils 120C and 120B to the variable voltage generator circuits 140 and 145. Such coupling allows a current produced by the voltage difference between the voltages 155 and 160 to pass between the variable voltage generator circuits 140 and 145 through a winding of the electric motor 105 provided by the coils 120C and 120B. In commutation state 5, the voltage 155 is applied to the coil 120C through the switch 210C, the voltage 160 is applied to the coil 120B through the switch 210E, and the voltages 155 and 160 are not applied to the coil 120A.

In commutation state 6, the switches 210A and 210E are in an on state whereas the remaining switches 210B-D and 210F are in an off state based on a state of the corresponding switch control signals $V_1$ through $V_6$. The switch 210E remains turned on (e.g., from commutation state 5) and the switch 210A is turned on. The switches 210A and 210E couple the coils 120A and 120B to the variable voltage generator circuits 140 and 145. Such coupling allows a current produced by the voltage difference between the voltages 155 and 160 to pass between the variable voltage generator circuits 140 and 145 through a winding of the electric motor 105 provided by the coils 120A and 120B. In commutation state 6, the voltage 155 is applied to the coil 120A through the switch 210A, the voltage 160 is applied to the coil 120B through the switch 210E, and the voltages 155 and 160 are not applied to the coil 120C.

Figure 5:
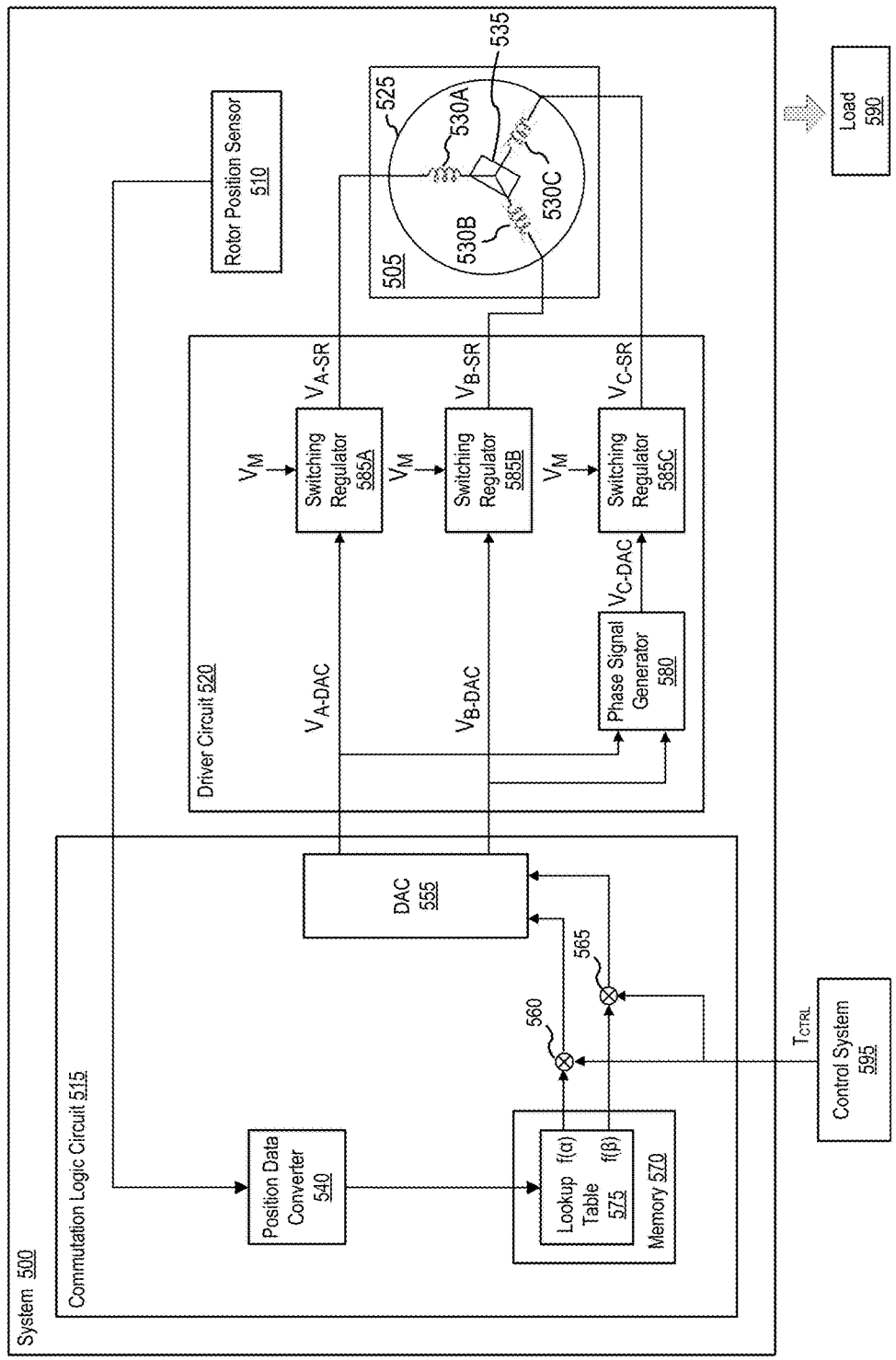
FIG. 5 illustrates a block diagram of another system for facilitating control of an electric motor in accordance with an embodiment of the present disclosure.

FIG. 5 illustrates a block diagram of a system 500 for facilitating control of an electrical motor in accordance with an embodiment of the present disclosure. The system 500 may be utilized to receive control signals from a control system 595 and provide torque to a load 590. The system 500 includes an electric motor 505, a rotor position sensor 510, a commutation logic circuit 515, and a driver circuit 520. The electric motor 505 includes a stator 525, coils 530A-C, and a rotor 535. In an embodiment, the electric motor 105 may be, may include, or may be a part of, a BLDC motor. The electric motor 505, stator 525, coils 530A-C, rotor 535, control system 595, and load 590 of FIG. 5 may be implemented in the same or similar manner as corresponding features of FIG. 1.

The rotor position sensor 510 determines a position of the rotor 535 and generates a rotor position signal based on the determined position. The position of the rotor 535 may be an orientation (e.g., physical rotation orientation) of a permanent magnet of the rotor 535 with respect to the stator 525 (e.g., the coils 530A-C). In some embodiments, the rotor position sensor 510 may be mounted concentric to the electric motor 505. The rotor position sensor 510 may include resolvers, encoders, and/or generally any other devices that can generate information indicative of the position of the rotor 535 at an appropriate resolution based on application. In one example, the rotor position sensor 510 may provide information indicative of the position of the rotor 535 at 16 bit resolution.

The commutation logic circuit 515 includes a position data converter 540, memory 570, combiner circuits 560 and 565, and a digital-to-analog converter (DAC) 555. The position data converter 540 receives the position information from the rotor position sensor 510 and converts the position information to a format (e.g., message format, range of acceptable values) appropriate for facilitating access of data stored the memory 570. The memory 570 stores a lookup table 575, where each entry is associated with a position of the rotor 535. The memory 570 receives an output from the position data converter 540 that is, or is indicative of, the position of the rotor 535 and is associated with an entry of the lookup table 575.

In response to the output of the position data converter 540, entries of the lookup table 575 associated with the output of the position data converter 540 may be accessed and values associated with these entries may be retrieved. In FIG. 5, a value for a function $f(\alpha)$ and a value for a function $f(\beta)$ may be retrieved from the lookup table 575 in response to the output from the position data converter 540. In some cases, the output from the position data converter 540 may be one or more identifiers associated with one or more of the entries of the lookup table 575 to be accessed and retrieved.

The rotor position sensor 510, position data converter 540, and lookup table 575 may each be associated with a resolution. For example, in a case that the position data converter 540 converts position information from the rotor position sensor 510 into one of 65,536 possible values (e.g., $2^{16}$ values), the resolution associated with the position data converter 540 may be expressed as 1/65,536 radians. In this example, the rotor position sensor 510 and position data converter 540 may be collectively referred to as providing position data at 16 bit resolution. Similarly, in the case that the lookup table 575 has 65,536 entries, the resolution associated with the lookup table 575 be expressed as 1/65,536 radians or 16 bit resolution. In this regard, an angular distance between two entries of the lookup table 575 associated with adjacent angular distances (e.g., in the discretized/digital domain) may be 1/65,536 radians. The rotor position sensor 510, position data converter 540, and/or lookup table 575 may be, but need not be, designed to have the same resolution, so long as sufficiently accurate (e.g., dependent on application) rotor position is relayed from the rotor position sensor 510 to the commutation logic circuit 515. A higher resolution (e.g., higher granularity, smaller angular distance between two entries) is generally associated with finer control of electric motor 505. In some cases, given a certain amount of electrical cycles per mechanical 360° based on a number of pole pairs, the lookup table 575 may store multiple cycles (e.g., instead of one cycle) over a range of the rotor position sensor 510.

In some embodiments, $f(\alpha)$ and $f(\beta)$ are sinusoidal functions, with $f(\alpha)$ being, or being based on, $\sin(\alpha)$ and $f(\beta)$ being, or being based on, $\sin(\beta)$. In some cases, $\alpha=\theta$ and $\beta=\theta+120°$ (e.g., the functions are shifted 120° apart), where $\theta$ is an angular value indicative of the position of the rotor 535 (e.g., as detected by the rotor position sensor 510 and converted to an appropriate value by the position data converter 540 for accessing the lookup table 575).

In one example, the lookup table 575 may contain values for $\sin(\theta)$ (i.e., a pure sine wave). In this example, the values retrieved from the lookup table 575 based on the value of $\theta$ may be for $\sin(\theta)$ and $\sin(\theta+120°)$, where the angular position $\theta$ or data indicative of the angular position $\theta$ is provided by the position data converter 540. In another example, the lookup table 575 may contain values for a sine wave with third-order harmonics injected. In this example, the lookup table 575 may contain values for $1.15*\sin(\theta)+0.19*\sin(3\theta)$ The values retrieved from the lookup table 575 may be $f(\alpha)=1.15*\sin(\theta)+0.19*\sin(3\theta)$ and $f(\beta)=1.15*\sin(\theta+120°)+0.19*\sin(3(\theta+120°))$.

The functions whose values are stored in the lookup table 575 may be dependent on application. In some cases, for example, utilization of a sine wave with higher-order harmonics injected may allow more optimal usage of available phase voltages (e.g., $V_{A-SR}$, $V_{B-SR}$, $V_{C-SR}$) to the electric motor 505 relative to a motor supply voltage (e.g., $V_M$) compared to a case in which a pure sine wave is utilized. It is noted that a pure sine wave and a sine wave with third-harmonic injection are provided by way of non-limiting example. In an aspect, a sinusoidal waveform may refer to a pure sine wave as well as a sine wave with higher-order harmonics injected. Other sinusoidal waveforms (e.g., sine waves with other higher-order harmonics injected) or generally any smooth, periodic waveform (e.g., smooth, periodic, and continuous waveform) may be utilized.

The combiner circuits 560 and 565 receive the values from the lookup table 575 and a torque control signal $T_{CTRL}$ from the control system 595. In an embodiment, the torque control signal $T_{CTRL}$ may be a scaling factor applied to the values retrieved from the lookup table 575. For example, when the combiner circuit 560 receives a value $\sin(\theta)$ and the combiner circuit 565 receives a value) $\sin(\theta+120°)$, respectively, from the lookup table 575, the combiner circuit 560 may output a value $T_{CTRL} \sin(\theta)$ and the combiner circuit 565 may output a value $T_{CTRL} \sin(\theta+120°)$. In one example, the entries retrieved from the lookup table 575 may be 16 bits and outputs of the combiner circuits 560 and 565 may be 16 bits.

As previously indicated, the torque control signal $T_{CTRL}$ may be used to set a torque applied by the electric motor 505 on the load 590, or equivalently the torque control signal $T_{CTRL}$ may be used to set a rotational speed of the electric motor 505. In an embodiment, the torque control signal $T_{CTRL}$ may be provided as a digital value. The torque control signal $T_{CTRL}$ may be a parameter whose value can be adjusted autonomously by the control system 595 and/or adjusted manually by a user via the control system 595 (e.g., the control system 595 may convert the user's input to an appropriate value for the combiner circuits 560 and 565.)

The DAC 555 converts the outputs of the combiner circuits 560 and 565 to analog motor phase control signals (e.g., also referred to as a motor phase command voltages) and provides these analog motor phase control signals to the driver circuit 520. In this regard, the DAC 555 may generate an analog motor phase control signal $V_{A\text{-}DAC}$ and $V_{B\text{-}DAC}$ based on the output of the combiner circuit 560 and 565, respectively.

The driver circuit 520 receives the motor phase control signals $V_{A\text{-}DAC}$ and $V_{B\text{-}DAC}$, generates electrical drive signals $V_{A\text{-}SR}$ and $V_{B\text{-}SR}$ based at least on the received motor phase control signals, and energizes the windings by providing a respective electrical drive signal to each of the coils 530A-C and allowing current to pass through the coils 530A-C. In an embodiment, the motor phase control signals and electrical drive signals are provided as voltages and may be referred to as motor phase control voltages and electrical drive voltages, respectively. In this regard, for example, the commutation logic circuit 515 provides the motor phase control voltages to the driver circuit 520 to cause appropriate electrical drive voltages to be generated and applied by the driver circuit 520 to the coils 530A-C.

The driver circuit 520 includes a phase signal generator 580 and switching regulator circuits 585A-C. The phase signal generator 580 may generate a third motor phase control voltage $V_{C\text{-}DAC}$ based on the other two motor phase control voltages $V_{A\text{-}DAC}$ and $V_{B\text{-}DAC}$. In FIG. 5, since the electric motor 505 has a wye-motor configuration, the third motor phase control voltage is an inverse of a sum of the other motor phase control voltages. In other words, $V_{C\text{-}DAC} = -(V_{A\text{-}DAC} + V_{B\text{-}DAC})$. The phase signal generator 580 may include an analog summer since, at a given instant in time, $V_{A\text{-}DAC}$ and $V_{B\text{-}DAC}$ are each a scalar voltage. The motor phase control voltages are 120° phase shifted from each other. For example, if $V_{A\text{-}DAC}$ can be expressed as $\sin(\theta)$, then $V_{B\text{-}DAC}$ can be expressed as) $\sin(\theta+120°)$ and $V_{C\text{-}DAC}$ can be expressed $\sin(\theta-120°)$.

The switching regulator circuits 585A, 585B, and 585C generate electrical drive voltages $V_{A\text{-}SR}$, $V_{B\text{-}SR}$, and $V_{C\text{-}SR}$, respectively, based at least on the motor phase control voltages $V_{A\text{-}DAC}$, $V_{B\text{-}DAC}$, and $V_{C\text{-}DAC}$, respectively. In this regard, for example, as the motor phase control voltage $V_{A\text{-}DAC}$ changes, the electrical drive voltage $V_{A\text{-}SR}$ that is output by the switching regulator circuit 585A changes accordingly. More generally, the voltages $V_{A\text{-}DAC}$, $V_{B\text{-}DAC}$, and $V_{C\text{-}DAC}$ change in response to different values being retrieved from the lookup table 575 as the electric motor 505 rotates and/or in response to a change in the torque control signal $T_{CTRL}$. The change in the motor phase control voltages $V_{A\text{-}DAC}$, $V_{B\text{-}DAC}$, and $V_{C\text{-}DAC}$ in turn cause the electrical drive voltages $V_{A\text{-}SR}$, $V_{B\text{-}SR}$ and $V_{C\text{-}SR}$ to change. In this regard, the commutation logic circuit 515 provides motor phase control voltages as outputs based on values retrieved from the lookup table 575 in order to provide (e.g., drive) outputs of the switching regulator circuits 585A-C to the windings formed by the coils 530A-C. It is noted that $V_{A\text{-}DAC}$ and $V_{A\text{-}SR}$ may be referred to as controlling a Phase A of the electric motor 505 (e.g., via driving the coil 530A based on $V_{A\text{-}DAC}$ and $V_{A\text{-}SR}$), $V_{B\text{-}DAC}$ and $V_{B\text{-}SR}$ as controlling a Phase B of the electric motor 505, and $V_{C\text{-}DAC}$ and $V_{C\text{-}SR}$ as controlling a Phase C of the electric motor 505.

The values of the electrical drive voltages $V_{A\text{-}SR}$, $V_{B\text{-}SR}$, and $V_{C\text{-}SR}$ relative to each other allow current to continuously pass through the coils 530A-C. The current through the coils 530A-C cause the rotor 535 to continuously rotate and produce torque of the electric motor 505 during operation of the electric motor 505. The current through the coils 530A-C may be sinusoidal and thus continuous with little or no EMI effects. In some applications, a current feedback may be provided in each phase leg to facilitate detection of current through the coils 530A-C and and/or facilitate causing of a certain amount of current to pass through each of the coils 530A-C. The switching regulator circuits 585A-C may be connected to and powered at least in part by a power supply that provides a motor supply voltage $V_M$. The switching regulator circuits 585A-C may, but need not, share a common power supply.

In an embodiment, the switching regulator circuits 585A-C utilize PWM to generate their respective electrical drive voltages $V_{A\text{-}SR}$, $V_{B\text{-}SR}$ and $V_{C\text{-}SR}$. A duty cycle of the respective PWM signals may be based on the motor phase control voltages $V_{A\text{-}DAC}$, $V_{B\text{-}DAC}$, and $V_{C\text{-}DAC}$ and determines a percentage of time that switching elements of the switching regulator circuits 585A-C conduct and, in turn, the electrical drive voltages $V_{A\text{-}SR}$, $V_{B\text{-}SR}$, and $V_{C\text{-}SR}$.

The switching regulator circuits 585A-C may each include a switch(es), a diode(s), an inductor(s), and/or input/output capacitors. The inductor(s) and capacitor(s) may effectively form an LC filter(s) that smooth out voltages and reduce or avoid noise (e.g., ripple voltages, ripple currents), such as PWM switching noise, and provide filtered output voltages (e.g., the electrical drive voltages $V_{A\text{-}SR}$, $V_{B\text{-}SR}$, and $V_{C\text{-}SR}$) that are smooth and essentially DC (e.g., low frequency) relative to the PWM switching frequencies. Similarly, current through the coils 530A-C are essentially DC relative to the switching frequencies associated with the switching regulator circuits 585A-C.

The ripple voltage may be a few millivolts for the electrical drive voltages $V_{A\text{-}SR}$, $V_{B\text{-}SR}$, and $V_{C\text{-}SR}$. As such, noise associated with switching frequencies are filtered by the LC filter(s) of the switching regulator circuits 585A-C, such that an inductance of the electric motor 505 is decoupled from (e.g., not part of) the filtering process. In some cases, by reducing the ripple voltage, the ripple current (e.g., a rate of change of current) through the coupled windings may be reduced. The ripple current may be based at least on a ratio of the generated voltage (e.g., $V_{A\text{-}SR}$, $V_{B\text{-}SR}$, and $V_{C\text{-}SR}$) to the inductance associated with the switching regulator circuits 585A-C.

As such, the PWM utilized as part of the switching regulator circuits 585A-C is effectively decoupled from the electric motor 505. While discontinuous PWM signals are utilized to generate the electrical drive voltages $V_{A\text{-}SR}$, $V_{B\text{-}SR}$, and $V_{C\text{-}SR}$, the electrical drive voltages $V_{A\text{-}SR}$, $V_{B\text{-}SR}$, and $V_{C\text{-}SR}$ are provided as smooth, continuous, analog waveforms that based on values retrieved from the lookup table 575 as the rotor 535 rotates and are thus non-PWM signals. In this regard, the voltages $V_{A\text{-}DAC}$, $V_{B\text{-}DAC}$, $V_{C\text{-}DAC}$, $V_{A\text{-}SR}$, $V_{B\text{-}SR}$, and $V_{C\text{-}SR}$ are each a scaled and/or offset version of a respective value retrieved from the lookup table 575. In some embodiments, the frequency associated with the electrical drive voltages $V_{A\text{-}SR}$, $V_{B\text{-}SR}$, and $V_{C\text{-}SR}$ and currents through the coils 530A-C may be in the tens or hundreds of Hz, whereas the PWM switching frequency may be in or around the MHz region. Example PWM switching frequencies may be around 500 kHz, 1 MHz, 2 MHz, among others.

In some cases, the ripple voltage may be a few millivolts for the electrical drive voltages $V_{A\text{-}SR}$, $V_{B\text{-}SR}$, and $V_{C\text{-}SR}$. As such, noise associated with switching frequencies may be filtered by the LC filter(s) of the switching regulator circuits 585A-C, such that an inductance of the electric motor 505 is decoupled from (e.g., not part of) the filtering process. In some cases, by reducing the ripple voltage, the ripple current (e.g., a rate of change of current) through the coupled windings may be reduced. The ripple current may be based at least on a ratio of the generated electrical drive voltage (e.g., $V_{A-SR}$, $V_{B-SR}$, and $V_{C-SR}$) to the inductance associated with the switching regulator circuits 585A-C.

Thus, in some cases, the electrical drive voltages provided to the coils 530A-C have already been filtered (e.g., smoothed out) by the switching regulator circuits 585A-C. The filtering provided by the switching regulator circuits 585A-C helps decouple the electric motor 505 (e.g., resistance and/or inductance of the electric motor 505) from being utilized to filter the voltages provided to the coils 530A-C, as the electrical drive voltages are already filtered waveforms. In addition, the switching regulator circuits 585A-C may be small in size, thus saving on chip real estate compared to larger voltage generators. In an embodiment, high switching action associated with the switching regulator circuits 585A-C may be provided at a distance away from the electric motor 505. For example, the switching regulator circuits 585A, 585B, and/or 585C may be provided on a separate chip that provides the voltages $V_{A-SR}$, $V_{B-SR}$, and $V_{C-SR}$ respectively.

It is noted that not all of the depicted components may be required, however, and one or more embodiments may include additional components not shown in FIG. 5. Variations in the arrangement and type of the components may be made. Additional components, different components, and/or fewer components may be provided.

For example, although FIG. 5 provides an implementation in which a third motor phase control voltage $V_{C-DAC}$ is generated based on two other motor phase control voltages $V_{A-DAC}$ and $V_{B-DAC}$ (e.g., with the two other motor phase control voltages being directly generated based on entries from the lookup table 575), in other embodiments all three motor phase command voltages may be directly generated based on entries from the lookup table 575.

As another example, in some cases, the rotor position sensor 510 may provide (e.g., generate, encode) rotor position data in a format that can be directly provided to the lookup table 575 to allow retrieval of values associated with the rotor position data. In this regard, the position data converter 540 may be omitted from the commutation logic circuit 515 and/or embedded as part of the rotor position sensor 510.

In an embodiment, one or more of the rotor position sensor 510, commutation logic circuit 515, and/or driver circuit 520, and/or components therein (e.g., position data converter 540, DAC 555) may include and/or may be implemented as one or more microprocessors, microcontrollers, ASICs, PLDs (e.g., FPGAs, CPLDs, FPSCs, or other types of programmable devices), codecs, and/or other processing devices. The various components 510, 515, and/or 520 may include memory for storing instructions and other information for facilitating control of electric motors. In this regard, the communication logic circuit 515 includes the memory 570 for storing the lookup table 575.

Figure 6:
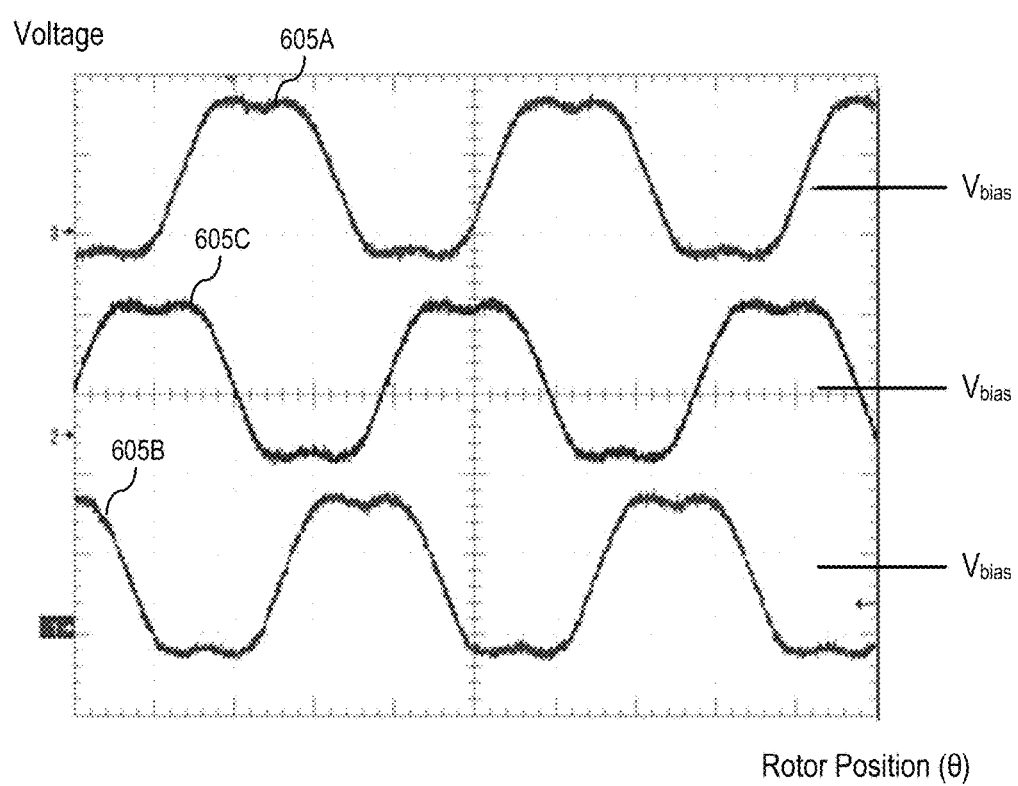
FIG. 6 illustrates voltage diagrams associated with phases of an electric motor in accordance with an embodiment of the present disclosure.

FIG. 6 illustrates voltage diagrams 605A-C associated with phases of an electrical motor in accordance with an embodiment of the present disclosure. In an embodiment, the voltage diagrams 605A, 605B, and 605C may represent the voltages input to and/or output by the switching regulators 585A, 585B, and 585C of FIG. 5. In this regard, since the switching regulator circuits 585A-C may generate a scaled and/or offset version of an input signal, the voltage diagrams 605A, 605B, and 605C may represent the motor phase control voltages $V_{A-DAC}$, $V_{B-DAC}$, and $V_{C-DAC}$, respectively, at the input of the switching regulator circuits 585A-C, or they may represent the electrical drive voltages $V_{A-SR}$, $V_{B-SR}$, and $V_{C-SR}$ at the output of the switching regulator circuits 585A-C. The switching regulator circuits 585A-C may be biased at a bias voltage $V_{bias}$. In some cases, the bias voltage $V_{bias}$ may be at or around approximately half the motor supply voltage $V_M$, such as to allow a symmetrical swing to be generated for $V_{A-SR}$, $V_{B-SR}$, and $V_{C-SR}$. For example, the voltage diagrams 605A, 605B, and 605C show the voltages $V_{A-SR}$, $V_{B-SR}$, and $V_{C-SR}$, respectively, as a function of rotor position θ, with a bias voltage $V_{bias}=V_M/2$.

In FIG. 6, the voltage diagrams 605A, 605B, and 605C are saddle-shaped voltage waveforms defined by sine waves with a third-order harmonic injected. The voltage diagram 605A can be represented by $1.15*\sin(\theta)+0.19*\sin(3\theta)$. The voltage diagrams 605B and 605C are phase shifted versions of the voltage diagram 605A. In this regard, the voltage diagram 605B may be represented by) $1.15*\sin(\theta+120°)+0.19*\sin(3(\theta+120°))$, and the voltage diagram 605C may be represented by $-1.15(\sin(\theta+240°)+0.19*\sin(3(\theta+240°)))$. It is noted that the voltage diagrams 605A-C are provided by way of non-limiting example. Other voltage waveforms, such as a different saddle-shaped sine wave, pure sine wave, or other smooth, periodic waveform may be utilized.

Figure 7:
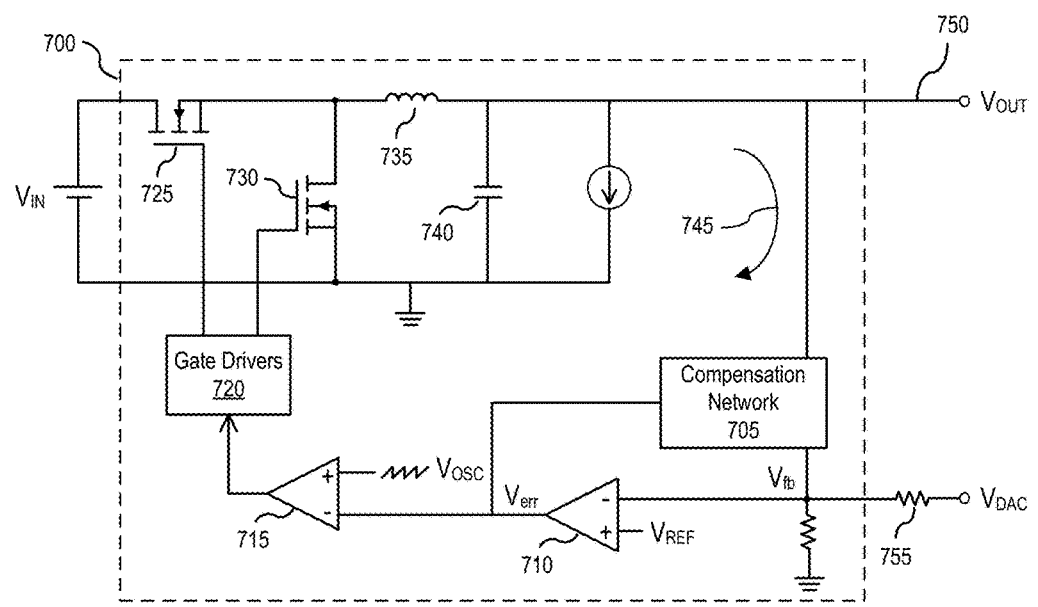
FIG. 7 illustrates an example switching regulator circuit in accordance with an embodiment of the present disclosure.

FIG. 7 illustrates an example switching regulator circuit 700 in accordance with an embodiment of the present disclosure. In FIG. 7, the switching regulator circuit 700 is a buck converter that may generate an output voltage $V_{OUT}$ at an output node 750 based at least on an input voltage $V_{IN}$ and a modulation voltage $V_{DAC}$, where $V_{OUT}<V_{IN}$. In some embodiments, the variable voltage generator circuits 140 and/or 145, and/or switching regulator circuits 220, 230, 585A, 585B, and/or 585C may be, may include, may be a part of, and/or may have a similar architecture to, the switching regulator circuit 700. For example, with reference to FIGS. 5 and 7, the switching regulator 700 may be any one of the switching regulators 585A-C, in which the input voltage $V_{IN}$ may be, or may be generated based on, the motor supply voltage $V_M$.

The switching regulator circuit 700 includes a compensation network 705, an error amplifier 710, a PWM generator 715, a gate driver 720, switches 725 and 730, an inductor 735, and a capacitor 740. The compensation network 705 and error amplifier 710 provide a feedback loop 745. The compensation network 705 generates a feedback voltage $V_{fb}$ based on the output voltage $V_{OUT}$ and an output voltage $V_{err}$ of the error amplifier 710. The error amplifier 710 generates the output voltage $V_{err}$ based on the feedback voltage $V_{fb}$ and a reference voltage $V_{REF}$. For example, the error amplifier 710 may generate its output voltage $V_{err}$ by comparing the feedback voltage $V_{fb}$ to the reference voltage $V_{REF}$. The output voltage $V_{err}$ of the error amplifier 710 may be referred to as an error signal. In this regard, a larger difference between the feedback voltage $V_{fb}$ and the reference voltage $V_{REF}$ is generally associated with a larger error signal.

The PWM generator 715 generates a PWM signal based on the output voltage $V_{eff}$ of the error amplifier 710 and an oscillating signal $V_{OSC}$, such as a sawtooth signal. For example, the PWM generator 715 may generate the PWM signal by comparing the voltage $V_{eff}$ to the oscillating signal $V_{OSC}$. The gate driver 720 generates appropriate voltages for the switches 725 and 730 based on the PWM signal from the PWM generator 715. The switches 725 and 730 can turn on (e.g., close) or turn off (e.g., open) in response to voltages applied on the switches 725 and 730 by the gate driver 720. In some cases, the PWM switching frequency may be in or around the MHz region. Example PWM switching frequencies may be around 500 kHz, 1 MHz, 2 MHz, among others. As shown in FIG. 7, the switches 725 and 730 may be implemented using transistors. Alternatively or in addition to transistors, other types of switching devices or switching mechanisms, such as thyristors, SCRs, reed relays, solid state relays, and/or generally any kind of electrically controlled bidirectional switch can be used to implement the switches 725 and 730.

In an embodiment, only one of the switches 725 and 730 is turned on at a time. When the switch 725 is on (e.g., closed) and the switch 730 is off (e.g., open), the inductor 735 is directly coupled to $V_{IN}$ (e.g., the inductor 735 is connected to the input voltage supply) such that current flows from $V_{IN}$ to a load (not shown in FIG. 7) that is connected to $V_{OUT}$. When the switch 725 is off and the switch 730 is on, the inductor 735 is connected to ground and current flows from ground to $V_{OUT}$. In this case, energy stored in the inductor 735 is discharged via the load. It is noted that, as used herein, $V_{IN}$ may refer to a value of an input voltage to the switching regulator circuit 700, an input node at which the voltage value is $V_{IN}$, or a power supply that provides the voltage $V_{IN}$. Similarly, $V_{OUT}$ may refer to a value of an output voltage of the switching regulator circuit 700 or an output node at which the voltage value is $V_{OUT}$.

The inductor 735 and capacitor 740 effectively form an LC filter that can smooth out a voltage and reduce or avoid noise (e.g., ripple voltage, ripple current) and can provide the smoothed out voltage as the output $V_{OUT}$ of the switching regulator circuit 700 at the output node 750. For example, the load connected to $V_{OUT}$ may include a motor (e.g., electric motor 505) or a portion thereof (e.g., one of the coils 530A-C of the electric motor 505) to which the output voltage $V_{OUT}$ is applied. As such, the motor (e.g., the coil of the motor) may receive a smooth, filtered voltage signal from the switching regulator circuit 700.

As previously indicated, the output voltage $V_{OUT}$ may be controlled (e.g., regulated) by the feedback loop 745 provided by the switching regulator 700 using the compensation network 705 and error amplifier 710. In this regard, for example, for a given range of input voltages $V_{IN}$, the feedback loop 745 may maintain the output voltage $V_{OUT}$ at a target voltage. For example, when the output voltage $V_{OUT}$ increases to a level above the target voltage, the feedback voltage $V_{fb}$ increases and the output voltage $V_{eff}$ of the error amplifier 710 decreases. Thus, the duty cycle associated with the PWM cycle decreases and the output voltage $V_{OUT}$ is pulled back to cause $V_{fb}=V_{REF}$.

As shown in FIG. 7, the voltage $V_{DAC}$ is injected in the feedback loop 745 of the switching regulator circuit 700. A resistor 755 couples the voltage $V_{DAC}$ into the switching regulator 700. As the injected voltage $V_{DAC}$ changes, the feedback loop 745 is modulated by the voltage $V_{DAC}$, with the error amplifier 710 adaptively generating its output voltage $V_{err}$ in response to changes in the injected voltage $V_{DAC}$ (e.g., as the motor rotates). As such, the output voltage $V_{err}$ of the error amplifier 710 is based on the injected voltage $V_{DAC}$, which in turn affects the PWM signal generated by the PWM modulator 715. In this regard, the voltage $V_{DAC}$ may be referred to as a modulating voltage that modulates the feedback loop 745 of the switching regulator circuit 700 and affects the modulation performed by the PWM modulator 715.

As an example, the switching regulator circuit 700 may be the switching regulator circuit 585B of FIG. 5. In this example, the injected voltage $V_{DAC}$ is the motor phase control voltage $V_{B-DAC}$ provided by the DAC 555. As the electric motor 505 rotates, the feedback loop 745 and, in turn, the output voltage $V_{OUT}$ of the switching regulator circuit 700 may follow (e.g., trace, align with) a scaled and/or offset version of the motor phase control voltage $V_{B-DAC}$, which in turn is a scaled and/or offset version of a value provided by the lookup table 575. In this regard, the feedback loop 745 of the switching regulator circuit 700 is modulated by the motor phase control voltage $V_{C-DAC}$, which in turn affects the modulation performed by the PWM modulator 715. Similarly, the switching regulator circuits 585A and 585C may utilize an architecture that is similar to or the same as the switching regulator circuit 700, with the motor phase command voltages $V_{A-DAC}$ and $V_{C-DAC}$ injected into the feedback loop 745 provided by the switching regulator circuits 585A and 585B, respectively.

As such, in some embodiments, as the electric motor 505 rotates, each of the coils 530A-C has a sinusoidal voltage applied to it and passes a sinusoidal current (e.g., a smooth sinusoidal current). The driving of such smooth, continuous, analog signals (e.g., voltages, currents) on an electric motor 505 is in contrast to implementations of electric motors 505 where PWM representations of signals may be driven directly on an electric motor (e.g., without smoothing from filtering provided by a switching regulator circuit), and/or windings of an electric motor may be energized or de-energized with periodicity based on a commutation. The driving of PWM representations of signals on an electric motor (e.g., by using PWM signals to turn on and off switches in order to steer current through the windings) may be associated with high noise, such as high switching noise, which may couple to components of an electrical motor and/or a load coupled to the electrical motor and affect performance. The energizing and de-energizing of windings may lead to discontinuities in the voltage and current associated with the windings, which may be associated with vibrations, such as audible noise.

With continued reference to FIG. 5, in a case that a bandwidth of the switching regulators 585A-C is sufficiently higher than anticipated rotational speeds of the electric motor 505, each electrical drive signal (e.g., $V_{A-SR}$, $V_{B-SR}$, $V_{C-SR}$) may include a modulated phase voltage (e.g., with adequate current capability) along with low levels of residual switching noise due to switching operations at the switching regulator circuits 585A-C. In this case, the switching noise is generally several orders of magnitude lower than the voltages used to drive the electric motor 505 with desired torque (e.g., useful torque).

As another example, the foregoing description generally applies to the system 100 of FIGS. 1 and 2. In some embodiments, the switching regulator circuit 700 may be the switching regulator circuit 220. The voltage $V_{DAC}$ may be the voltage $V_{so1}$, which may itself be referred to as a torque control signal and may be a scaled and/or offset version of the torque control signal 165. The resistor 755 couples the voltage $V_{DAC}=V_{so1}$ into the feedback loop 745 of the switching regulator 700. Since the voltage $V_{so1}$ remains at a constant level as long as the torque control signal 165 remains constant, the switching regulator circuit 700 maintains the voltage $V_{M1}$ at a constant level as long as the torque control signal 165 remains constant. Similarly, the switching regulator circuit 230 may utilize an architecture that is similar to or the same as the switching regulator circuit 700, with the voltage $V_{so1}$ into the feedback loop 745 provided by the switching regulator circuit 230.

Although FIG. 7 illustrates an example of a buck converter (e.g., a voltage controlled buck converter), other architectures of a buck converter may be utilized (e.g., current mode-controlled buck converter). Alternatively or in addition, other types of variable voltage generator circuits may be utilized. By way of non-limiting example, the switching regulators 585A-C may include SEPICs, Ćuk converters, boost converters, buck-boost converters, other DC-DC converters, and/or generally any voltage generator circuit capable of receiving a motor phase control voltage (e.g., $V_{A-DAC}$, $V_{B-DAC}$, $V_{C-DAC}$) and generating a desired electrical drive voltage (e.g., $V_{A-SR}$, $V_{B-SR}$, $V_{C-SR}$). In some cases, a type or types of variable voltage generator circuits utilized in a given implementation may be based on an input voltage (e.g., magnitude) and desired electrical drive voltage.

Figure 8:
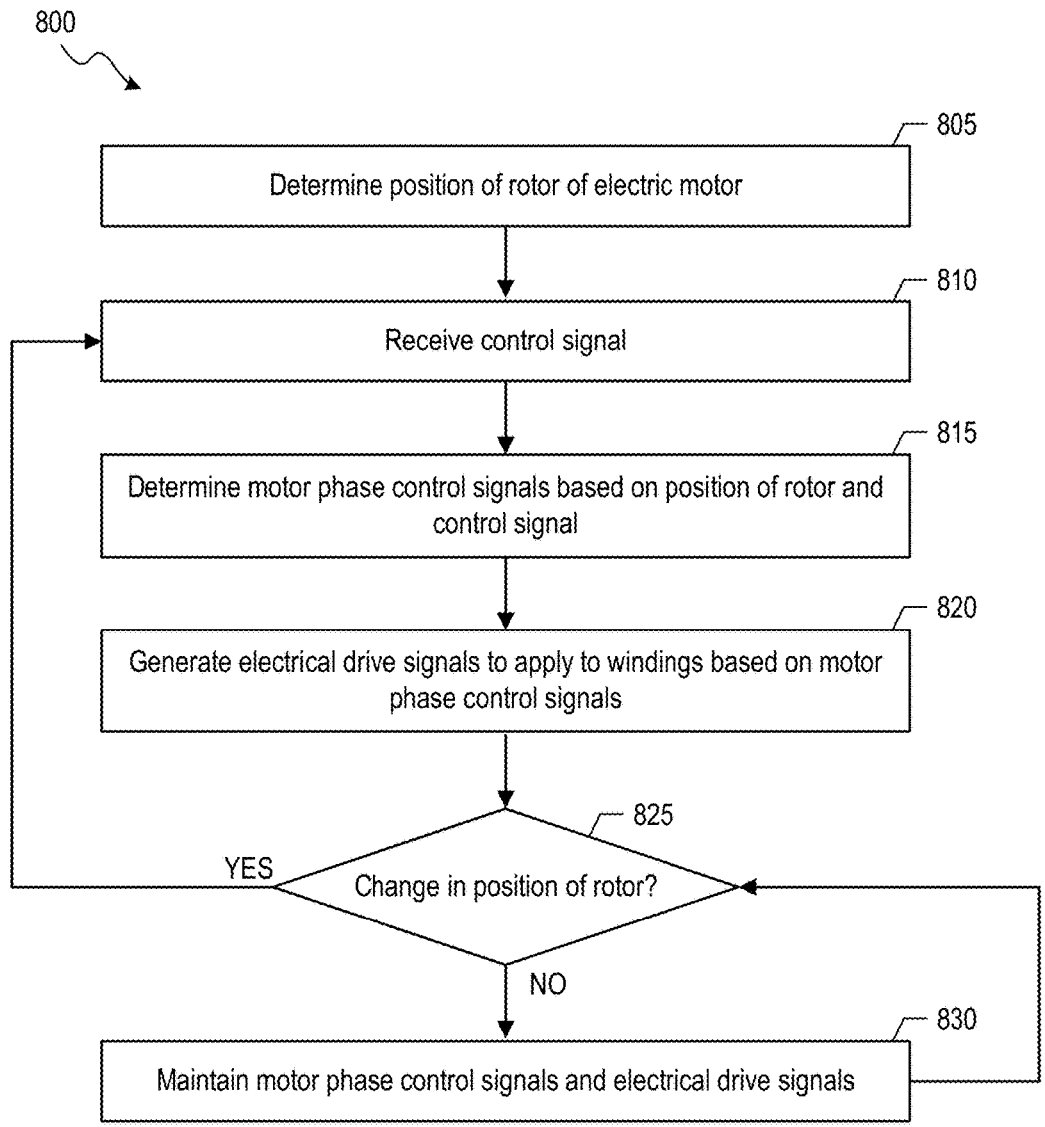
FIG. 8 illustrates a flow diagram of another example process for facilitating control of an electric motor in accordance with one or more embodiments of the present disclosure.

FIG. 8 illustrates a flow diagram of an example process 800 for facilitating control of an electric motor in accordance with one or more embodiments of the present disclosure. For explanatory purposes, the example process 800 is described herein with reference to the example the system 500 of FIG. 5. Note that one or more operations may be combined, omitted, and/or performed in a different order as desired.

At block 805, a position of the rotor 535 is determined by the rotor position sensor 510. In some cases, the position may be converted by the position data converter 540 to a format appropriate for the lookup table 575. At block 810, a torque control signal (e.g., $T_{CTRL}$) is received. For example, the torque control signal may be received by the combiner circuits 560 and 565 from the control system 595.

At block 815, motor phase control signals (e.g., $V_{A-DAC}$, $V_{B-DAC}$, $V_{C-DAC}$) are determined based on the position of the rotor 535 and the torque control signal. As an example, in FIG. 5, the motor phase control signals $V_{A-DAC}$ and $V_{B-DAC}$ are provided by the DAC 555 based on outputs of the combiner circuits 560 and 565. In this regard, the DAC 555 may convert digital outputs of the combiner circuits 560 and 565 to the analog motor phase control signals $V_{A-DAC}$ and $V_{B-DAC}$. The combiner circuits 560 and 565 may generate their outputs by combining (e.g., multiplying) values retrieved from the lookup table 575 based on the position of the rotor 535 with the torque control signal. The phase signal generator 580 may determine the motor phase control signal $V_{C-DAC}$ based on the motor phase control signal $V_{A-DAC}$ and $V_{B-DAC}$. As an example, $V_{C-DAC}=-(V_{A-DAC}+V_{B-DAC})$. The motor phase control signals $V_{A-DAC}$, $V_{B-DAC}$, and $V_{C-DAC}$ may be 120° phase-shifted from each other. The torque control signal may be utilized to cause the electric motor 505 to apply a desired torque.

At block 820, electrical drive signals to apply to the windings (e.g., formed by the coils 530A-C) are generated by the switching regulator circuits 585A-C. In this regard, the switching regulator circuits 585A, 585B, and 585C generates the electrical drive signal $V_{A-SR}$, $V_{B-SR}$, and $V_{C-SR}$, respectively, based on the corresponding motor phase control signal $V_{A-DAC}$, $V_{B-DAC}$, and $V_{C-DAC}$, respectively. In applying the electrical drive signals $V_{A-SR}$, $V_{B-SR}$, and $V_{C-BR}$ to the coils 530A, 530B, and 530C, respectively, current passes through each of the coils 530A, 530B, and 530C.

At block 825, a determination is made as to whether the position of the rotor 530 has changed. In this regard, an operation(s) performed at block 805 may be repeated in block 825. The determination may be made based on the position of the rotor 530 determined by the rotor position sensor 510. When a determination is made that the position of the rotor 530 has changed, the process 800 proceeds to block 810 in which the new position of the rotor 530 is utilized and the torque control signal is received. The torque control signal may remain the same as before or may have changed. When a determination is made that the position of the rotor 530 has not changed, the process 800 proceeds to block 830 in which the motor phase control signals and the electrical drive signals are maintained. In this regard, in FIG. 5, the DAC 555 maintains the motor phase control signals $V_{A-DAC}$ and $V_{B-DAC}$, the phase signal generator 580 maintains the motor phase control signal $V_{C-DAC}$, and the switching regulators 585A, 585B, and 585C maintain the electrical drive signals $V_{A-SR}$, $V_{B-SR}$, and $V_{C-SR}$, respectively. The process 800 proceeds to block 825 and continues to determine whether the position of the rotor 530 has changed.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

The invention claimed is:

1. A system comprising:
    a brushless direct current (BLDC) electric motor comprising a rotor and a plurality of windings, wherein the rotor is configured to rotate with an adjustable angular speed;
    a plurality of switching regulators, wherein each of the switching regulators is configured to generate a respective electrical drive signal based on a torque control signal, wherein at least one of the switching regulators is configured to adjust its respective electrical drive signal in response to an adjustment to the torque control signal, and wherein the angular speed of the rotor is based on the electrical drive signals; and
    a commutation logic circuit configured to selectively provide the electrical drive signals of the switching regulators to the windings based on a position of the rotor.

2. The system of claim 1, wherein:
the plurality of switching regulators comprises:
a first switching regulator configured to generate a first electrical drive signal based on the torque control signal, and
a second switching regulator configured to generate a second electrical drive signal based on the torque control signal, wherein the angular speed of the rotor is based on the first and second electrical drive signals;
the commutation logic circuit is configured to selectively provide the first and second electrical drive signals to the windings by generating a plurality of routing control signals based at least in part on the position of the rotor; and
the system further comprises a routing circuit configured to selectively couple at least one of the windings with the first and second switching regulators in response to the routing control signals.

3. The system of claim 2, wherein:
the first switching regulator is configured to adjust the first electrical drive signal in response to the adjustment to the torque control signal,
the second switching regulator is configured to adjust the second electrical drive signal in response to the adjustment to the torque control signal, and
the motor is configured to generate increased torque in response to the first and second adjusted electrical drive signals than in response to the first and second electrical drive signals.

4. The system of claim 2, wherein the routing circuit comprises a plurality of switches, wherein each switch is configured to receive a corresponding one of the routing control signals, and wherein each switch comprises two back-to-back coupled transistors sharing a common gate node and a common source/drain node.

5. The system of claim 4, wherein:
a first switch of the routing circuit is connected to the first switching regulator and the at least one of the windings;
a second switch of the routing circuit is connected to the second switching regulator and the at least one of the windings; and
the first and second switches are collectively configured to pass a current between the first and second switching regulators through the at least one of the windings in response to the routing control signals.

6. The system of claim 2, wherein the routing control signals are non-pulse width modulation signals maintained at fixed voltages while selectively coupling the at least one of the windings to the first and second switching regulators.

7. The system of claim 2, wherein each of the switching regulators comprises a feedback loop configured to be injected with an offset and/or scaled version of the torque control signal to adjust the electrical drive signals of the switching regulators.

8. A system comprising:
a brushless direct current (BLDC) electric motor comprising a rotor and a plurality of windings, wherein the rotor is configured to rotate with an adjustable angular speed;
a plurality of switching regulators, wherein each of the switching regulators is configured to generate a respective electrical drive signal based on a torque control signal, and wherein the angular speed of the rotor is based on the electrical drive signals; and
a commutation logic circuit configured to:
determine a plurality of sinusoidal motor phase control signals based on a position of the rotor, and
selectively provide the electrical drive signals of the switching regulators to the windings based on the position of the rotor,
wherein the electrical drive signals of the switching regulators are based on the sinusoidal motor phase control signals.

9. The system of claim 8, wherein the commutation logic circuit is configured to:
retrieve values from a lookup table based on the position of the rotor; and
adjust the values based on the torque control signal.

10. The system of claim 8, wherein each of the switching regulators comprises a feedback loop configured to be injected with a corresponding one of the sinusoidal motor phase control signals to adjust the electrical drive signals of the switching regulators.

11. A method comprising:
determining a position of a rotor of a brushless direct current (BLDC) electric motor, wherein the rotor is configured to rotate with an adjustable angular speed;
generating, by each of a plurality of switching regulators, a respective electrical drive signal based on a torque control signal, wherein at least one of the switching regulators is configured to adjust its respective electrical drive signal in response to an adjustment to the torque control signal, and wherein the angular speed of the rotor is based on the electrical drive signals;
selectively providing the electrical drive signals of the switching regulators to windings of the BLDC motor based on the position of the rotor; and
rotating the rotor in response to the electrical drive signals.

12. The method of claim 11, wherein:
the switching regulators comprise:
a first switching regulator configured to generate a first electrical drive signal based on the torque control signal, and
a second switching regulator configured to generate a second electrical drive signal based on the torque control signal, wherein the angular speed of the rotor is based on the first and second electrical drive signals; and
the method further comprises:
generating a plurality of routing control signals based at least in part on the position of the rotor, and
selectively coupling, by a routing circuit, at least one of the windings with the first and second switching regulators in response to the routing control signals.

13. The method of claim 12, further comprising:
adjusting the torque control signal;
adjusting, by the first switching regulator, the first electrical drive signal in response to the adjusted torque control signal; and
adjusting, by the second switching regulator, the second electrical drive signal in response to the adjusted torque control signal,
wherein the electric motor generates increased torque in response to the first and second adjusted electrical drive signal than in response to the first and second electrical drive signals.

14. The method of claim 12, wherein the routing circuit comprises a plurality of switches, wherein each switch is configured to receive a corresponding one of the routing control signals, and wherein each switch comprises two back-to-back coupled transistors sharing a common gate node and a common source/drain node.

15. The method of claim 14, further comprising:
passing a current between the first and second switching regulators through the at least one of the windings, wherein the current is based on the first and second electrical drive signals, and wherein the rotating is in response to the current,
wherein:
   a first switch of the routing circuit is connected to the first switching regulator and the at least one of the windings;
   a second switch of the routing circuit is connected to the second switching regulator and the at least one of the windings; and
   the passing comprising collectively passing, by the first and second switches, the current between the first and second switching regulators through the at least one winding in response to the routing control signals.

16. The method of claim 12, wherein the routing control signals are non-pulse width modulation signals maintained at fixed voltages while selectively coupling the at least one of the windings to the first and second switching regulators.

17. The method of claim 12, wherein the generating comprises injecting an offset and/or scaled version of the torque control signal into a feedback loop of each of the switching regulators to adjust the electrical drive signals of the switching regulators.

18. The method of claim 11, further comprising:
determining a plurality, of sinusoidal motor phase control signals based on the position of the rotor; and
providing the sinusoidal motor phase control signals to the switching regulators,
wherein the electrical drive signals of the switching regulators are generated in response to the sinusoidal motor phase control signals.

19. The method of claim 18, wherein the determining the sinusoidal motor phase control signals comprises:
retrieving values from a lookup table based on the position of the rotor; and
adjusting the values based on the torque control signal.

20. The method of claim 18, wherein the generating comprises injecting a corresponding one of the sinusoidal motor phase control signals into a feedback loop of each of the switching regulators to adjust the electrical drive signals of the switching regulators.

* * * * *

UNITED STATES PATENT AND TRADEMARK OFFICE
CERTIFICATE OF CORRECTION

PATENT NO. : 10,454,398 B2  
APPLICATION NO. : 15/963995  
DATED : October 22, 2019  
INVENTOR(S) : Ralph Hanseler and Mitchell Kary Page 1 of 1

It is certified that error appears in the above-identified patent and that said Letters Patent is hereby corrected as shown below:

In the Specification

In the Detailed Description:
In Column 25, Line 60, change "$V_{C-BR}$" to --$V_{C-SR}$--.

Signed and Sealed this
Twenty-eighth Day of January, 2020

Andrei Iancu
*Director of the United States Patent and Trademark Office*